US008974295B2

(12) United States Patent
Maharbiz et al.

(10) Patent No.: US 8,974,295 B2
(45) Date of Patent: Mar. 10, 2015

(54) INTELLIGENT GAME SYSTEM INCLUDING INTELLIGENT FOLDABLE THREE-DIMENSIONAL TERRAIN

(75) Inventors: Michel Martin Maharbiz, El Cerrito, CA (US); Steve Jaqua, Ann Arbor, MI (US); Theodore Morichau-Beauchant, Sevres (FR)

(73) Assignee: TweedleTech, LLC, Ann Arbor, MI (US)

( * ) Notice: Subject to any disclaimer, the term of this patent is extended or adjusted under 35 U.S.C. 154(b) by 0 days.

(21) Appl. No.: 12/878,876

(22) Filed: Sep. 9, 2010

(65) Prior Publication Data

US 2010/0331083 A1  Dec. 30, 2010

Related U.S. Application Data

(63) Continuation-in-part of application No. 12/476,888, filed on Jun. 2, 2009.

(60) Provisional application No. 61/130,878, filed on Jun. 3, 2008.

(51) Int. Cl.
*A63F 13/00* (2014.01)
*A63F 3/00* (2006.01)
(Continued)

(52) U.S. Cl.
CPC ......... *A63F 3/00003* (2013.01); *A63F 3/00214* (2013.01); *A63F 3/00643* (2013.01);
(Continued)

(58) Field of Classification Search
CPC .. A63F 3/00643; A63F 3/0214; A63F 3/0023
USPC ............... 463/30; 273/237; 446/478, 488
See application file for complete search history.

(56) References Cited

U.S. PATENT DOCUMENTS

| 3,843,132 A | 10/1974 | Ferguson |
| 4,337,948 A | 7/1982 | Breslow et al. |

(Continued)

FOREIGN PATENT DOCUMENTS

| DE | 4039315 A1 | 12/1990 |
| JP | 538228 | 1/1978 |

(Continued)

OTHER PUBLICATIONS http://www.designtaxi.com/news/32764/iPhone-Game-Goes-Beyond-theTouchscreen/.

(Continued)

*Primary Examiner* — Tramar Harper
*Assistant Examiner* — Anh Vo V Nguyen
(74) *Attorney, Agent, or Firm* — Haverstock & Owens LLP

(57) ABSTRACT

An intelligent game system and apparatus comprises one or more sensors, a controller, a projector, one or more game pieces and one or more foldable three-dimensional terrain pieces. The game board and terrain pieces comprise one or more sensors each having an identifier for sensing when a game piece or terrain piece is located on the game board and/or terrain piece. The sensors obtain object information from the game pieces and/or terrain pieces and transfer the object information to a controller. The sensors of the terrain pieces transfer the object information to the sensor of the terrain piece below them until the bottom terrain piece transfer the object information to a game board sensor. The controller is thereby able to track properties of the game and/or terrain pieces, such as position, and adjust the gameplay accordingly.

14 Claims, 26 Drawing Sheets

(51) Int. Cl.
*A63F 13/30* (2014.01)
*A63F 9/24* (2006.01)

(52) U.S. Cl.
CPC ....... *A63F13/12* (2013.01); *A63F 2003/00258* (2013.01); *A63F 2003/00394* (2013.01); *A63F 2003/00662* (2013.01); *A63F 2003/00668* (2013.01); *A63F 2009/2419* (2013.01); *A63F 2009/242* (2013.01); *A63F 2009/2467* (2013.01); *A63F 2009/247* (2013.01); *A63F 2009/2486* (2013.01); *A63F 2009/2489* (2013.01); *A63F 2300/1093* (2013.01); *A63F 2003/00223* (2013.01)
USPC ............... 463/30; 463/34; 273/237; 273/238

(56) References Cited

U.S. PATENT DOCUMENTS

| | | | |
|---|---|---|---|
| 4,348,191 A | | 9/1982 | Lipsitz et al. |
| 4,492,581 A | | 1/1985 | Arai et al. |
| 4,569,526 A | | 2/1986 | Hamilton |
| 4,666,160 A | | 5/1987 | Hamilton |
| 4,964,249 A | * | 10/1990 | Payne ................ 52/70 |
| 4,969,650 A | | 11/1990 | Magara et al. |
| 4,981,300 A | | 1/1991 | Winkler |
| 5,013,047 A | | 5/1991 | Schwab |
| 5,082,286 A | | 1/1992 | Ryan et al. |
| 5,096,204 A | * | 3/1992 | Lippman ................ 273/285 |
| 5,125,867 A | * | 6/1992 | Solomon ................ 446/488 |
| 5,188,368 A | | 2/1993 | Ryan |
| 5,190,285 A | | 3/1993 | Levy et al. |
| 5,397,133 A | | 3/1995 | Penzias |
| 5,460,381 A | | 10/1995 | Smith et al. |
| 5,662,508 A | * | 9/1997 | Smith ................ 446/128 |
| 5,791,988 A | | 8/1998 | Nomi |
| 5,853,327 A | | 12/1998 | Gilboa |
| 5,906,369 A | | 5/1999 | Brennan et al. |
| 5,919,073 A | * | 7/1999 | Shinoda et al. ................ 446/219 |
| 5,944,312 A | * | 8/1999 | Darneille ................ 273/157 R |
| 5,951,015 A | | 9/1999 | Smith et al. |
| 6,001,014 A | | 12/1999 | Ogata et al. |
| 6,012,961 A | | 1/2000 | Sharpe, III et al. |
| 6,102,397 A | | 8/2000 | Lee et al. |
| 6,227,931 B1 | | 5/2001 | Shackelford |
| 6,276,685 B1 | * | 8/2001 | Sterling ................ 273/241 |
| 6,443,796 B1 | | 9/2002 | Shackelford |
| 6,460,851 B1 | | 10/2002 | Lee et al. |
| 6,556,722 B1 | | 4/2003 | Russell et al. |
| 6,682,392 B2 | | 1/2004 | Chan |
| 6,690,156 B1 | | 2/2004 | Weiner et al. |
| 6,690,357 B1 | | 2/2004 | Dunton et al. |
| 6,761,634 B1 | | 7/2004 | Peterson |
| 6,835,131 B1 | | 12/2004 | White et al. |
| 6,937,152 B2 | | 8/2005 | Small |
| 7,008,316 B1 | | 3/2006 | Pugh |
| 7,059,934 B2 | * | 6/2006 | Whitehead ................ 446/477 |
| 7,081,033 B1 | | 7/2006 | Mawle et al. |
| 7,218,230 B2 | * | 5/2007 | Wu et al. ................ 340/572.1 |
| 7,394,459 B2 | | 7/2008 | Bathiche et al. |
| 7,474,983 B2 | | 1/2009 | Mazalek et al. |
| 7,704,146 B2 | * | 4/2010 | Ellis ................ 463/31 |
| 7,766,335 B1 | * | 8/2010 | Greenawalt ................ 273/241 |
| 7,775,883 B2 | | 8/2010 | Smoot et al. |
| 7,843,429 B2 | | 11/2010 | Pryor |
| 7,843,471 B2 | | 11/2010 | Doan et al. |
| 8,303,369 B2 | * | 11/2012 | Smith et al. ................ 446/478 |
| 8,608,529 B2 | * | 12/2013 | Smith et al. ................ 446/477 |
| 8,753,164 B2 | * | 6/2014 | Hansen et al. ................ 446/91 |
| 2002/0082065 A1 | | 6/2002 | Fogel |
| 2002/0158751 A1 | | 10/2002 | Bormaster |
| 2002/0167129 A1 | | 11/2002 | Stanton |
| 2002/0193047 A1 | | 12/2002 | Weston |
| 2003/0034606 A1 | * | 2/2003 | Jacobs ................ 273/236 |
| 2003/0071127 A1 | | 4/2003 | Bryant et al. |
| 2003/0119587 A1 | * | 6/2003 | Ohba et al. ................ 463/31 |
| 2003/0124954 A1 | | 7/2003 | Liu |
| 2003/0141962 A1 | | 7/2003 | Barink |
| 2003/0171142 A1 | | 9/2003 | Kaji et al. |
| 2003/0232649 A1 | | 12/2003 | Gizis et al. |
| 2004/0203317 A1 | * | 10/2004 | Small ................ 446/476 |
| 2004/0248650 A1 | | 12/2004 | Colbert et al. |
| 2004/0259465 A1 | | 12/2004 | Wright et al. |
| 2005/0043089 A1 | | 2/2005 | Nguyen |
| 2005/0059479 A1 | | 3/2005 | Soltys et al. |
| 2005/0137004 A1 | | 6/2005 | Wood et al. |
| 2005/0149865 A1 | | 7/2005 | Wang et al. |
| 2005/0162381 A1 | | 7/2005 | Bell et al. |
| 2005/0245302 A1 | | 11/2005 | Bathiche et al. |
| 2006/0043674 A1 | * | 3/2006 | Van Ness ................ 273/241 |
| 2006/0139314 A1 | | 6/2006 | Bell |
| 2006/0175753 A1 | | 8/2006 | MacIver et al. |
| 2006/0197669 A1 | * | 9/2006 | Wu et al. ................ 340/572.7 |
| 2006/0246403 A1 | | 11/2006 | Monpouet et al. |
| 2006/0254369 A1 | | 11/2006 | Yoon et al. |
| 2007/0015588 A1 | | 1/2007 | Matsumoto et al. |
| 2007/0057469 A1 | | 3/2007 | Grauzer et al. |
| 2007/0111795 A1 | | 5/2007 | Choi et al. |
| 2007/0201863 A1 | | 8/2007 | Wilson et al. |
| 2007/0216095 A1 | * | 9/2007 | Jacobs ................ 273/288 |
| 2007/0262984 A1 | | 11/2007 | Pruss |
| 2007/0275634 A1 | | 11/2007 | Wright et al. |
| 2008/0068173 A1 | | 3/2008 | Alexis et al. |
| 2008/0085773 A1 | | 4/2008 | Wood |
| 2008/0122805 A1 | | 5/2008 | Smith et al. |
| 2008/0172361 A1 | | 7/2008 | Wong et al. |
| 2008/0186174 A1 | | 8/2008 | Alexis et al. |
| 2008/0192300 A1 | | 8/2008 | Kenji |
| 2008/0220690 A1 | * | 9/2008 | Munch ................ 446/128 |
| 2008/0248847 A1 | | 10/2008 | Nakano et al. |
| 2008/0280682 A1 | | 11/2008 | Brunner |
| 2008/0315772 A1 | | 12/2008 | Knibbe |
| 2009/0023487 A1 | | 1/2009 | Gilson et al. |
| 2009/0069084 A1 | | 3/2009 | Reece et al. |
| 2009/0075733 A1 | | 3/2009 | Andersen et al. |
| 2009/0082105 A1 | | 3/2009 | Hegstrom |
| 2009/0089565 A1 | | 4/2009 | Buchanan et al. |
| 2009/0104988 A1 | * | 4/2009 | Enge et al. ................ 463/31 |
| 2009/0117994 A1 | | 5/2009 | Kelly |
| 2009/0137323 A1 | | 5/2009 | Fiegener et al. |
| 2009/0158210 A1 | | 6/2009 | Cheng |
| 2009/0227368 A1 | | 9/2009 | Wyatt |
| 2009/0309303 A1 | | 12/2009 | Wallace et al. |
| 2009/0315258 A1 | | 12/2009 | Wallace et al. |
| 2009/0322352 A1 | | 12/2009 | Zachut et al. |
| 2010/0004062 A1 | | 1/2010 | Maharbiz et al. |
| 2010/0032900 A1 | * | 2/2010 | Wilm ................ 273/237 |
| 2010/0151940 A1 | | 6/2010 | Borge |
| 2010/0164862 A1 | | 7/2010 | Sullivan et al. |
| 2010/0167623 A1 | | 7/2010 | Eyzaguirre et al. |
| 2010/0291993 A1 | * | 11/2010 | Gagner et al. ................ 463/25 |
| 2010/0331083 A1 | | 12/2010 | Maharbiz et al. |
| 2011/0089635 A1 | | 4/2011 | Miller |
| 2011/0111840 A1 | | 5/2011 | Gagner et al. |
| 2011/0269547 A1 | | 11/2011 | Harris |
| 2011/0312420 A1 | | 12/2011 | Portin |
| 2012/0049453 A1 | | 3/2012 | Morichau-Beauchant et al. |
| 2012/0052231 A1 | | 3/2012 | Jaqua et al. |
| 2012/0052934 A1 | | 3/2012 | Maharbiz et al. |
| 2012/0056717 A1 | | 3/2012 | Maharbiz et al. |
| 2012/0157206 A1 | | 6/2012 | Crevin et al. |
| 2012/0295703 A1 | | 11/2012 | Reiche et al. |

FOREIGN PATENT DOCUMENTS

| | | |
|---|---|---|
| JP | 2001228963 A | 8/2001 |
| JP | 2002135258 A | 5/2002 |
| JP | 2002156896 A | 5/2002 |
| JP | 2003230761 A | 8/2003 |
| JP | 2005-317032 | 11/2005 |
| JP | 2006142065 | 6/2006 |
| JP | 2008-501490 | 1/2008 |
| JP | 200877411 A | 4/2008 |
| WO | 2005078562 A1 | 8/2005 |
| WO | 2006033036 A2 | 3/2006 |

(56) References Cited

FOREIGN PATENT DOCUMENTS

| WO | WO/2006/136322 | * | 12/2006 | ............ A63F 13/00 |
| WO | 2007104693 A1 | | 9/2007 | |
| WO | W02012028827 A1 | | 3/2012 | |

OTHER PUBLICATIONS

Steve Hinske et al., "An RFID-based Infrastructure for Automatically Determining the Position and Orientation of Game Objects in Tabletop Games".

Saskia Bakker et al., "Interactive tangible objects as play pieces in a digital tabletop game", pp. 155-156, 2007.

Regan L. Mandryk et al., "False Prophets: Exploring Hybrid Board/Video Games".

Lopez De Ipina et al., "Trip: a Low-Cost Vision-Based Location System for Ubiquitous Computing", vol. 6, Issue 3, May 2002, pp. 206-219, Journal Personal and Ubiquitous Computing, and http://d1.acm.org/citation.cfm?id=594357.

* cited by examiner

| Register | Mnemonic | Description | Example value |
|---|---|---|---|
| 0 | UID-H | Unique identifier - high word | 0x0000..0xFFFF |
| 1 | UID-L | Unique identifier - low word | 0x0000..0xFFFF |
| 2 | ADDR | Sensor identifier | 0x0000..0xFFFF |
| ... | | | |
| 10 | LName | Long name (up to 30 characters) | "Zoltar" |
| ... | ... | ... | |
| 25 | Class | Class of character (e.g. Profession) | 1=Warrior |
| 26 | Race | Fictional race identifier | 2=Morlok |
| 27 | Stamina | Rate of recharge, points/min. | 5 |
| 28 | Experience | Experience points | 5,000 |
| 29 | Level | Power level 1..5, 5=highest | 2 |
| 30 | Hitpoints | Hitpoints (0=dead) | 0x0000...0xFFFF |
| 31 | WeaponCount | Count of weapons | 3 |
| 32 | WeaponID-1 | Weapon 1 identifier | 1=Sword |
| 33 | WeaponWT-1 | Weapon 1 weight, lbs. | 8 |
| ... | | | ... |
| 43 | Armor Count | Count of Armor | 2 |
| 44 | ArmorID-1 | Armor 1 identifier | 1=Shield |
| 45 | ArmorStrength-1 | Strength of armor (0..100) | 60 |
| ... | | | |
| 53 | AcessoryCount | Count of accessories | 1 |
| 54 | AccessoryID-1 | Accessory identifier | 1=Weapons belt |
| ... | | | |
| 127 | CKSUM | Checksum value (integrity check) | |

Fig. 7A

| Register | Mnemonic | Description | Example value |
|---|---|---|---|
| 0 | UID-H | Unique identifier - high word | 0x0000..0xFFFF |
| 1 | UID-L | Unique identifier - low word | 0x0000..0xFFFF |
| 2 | ADDR | Sensor identifier | 0x0000..0xFFFF |
| ... | | | |
| 10 | LName | Long name (up to 30 characters) | "Pawn" |
| ... | ... | ... | |
| 25 | Class | Class of chess piece | 0=Pawn |
| 26 | Player | Player side color: Black/White | 0=White, 1=Black |
| ... | | | |
| 127 | CKSUM | Checksum value (integrity check) | |

Fig. 7B

| Register | Mnemonic | Description | Example value |
|---|---|---|---|
| 0 | UID-H | Unique identifier - high word | 0x0000..0xFFFF |
| 1 | UID-L | Unique identifier - low word | 0x0000..0xFFFF |
| 2 | ADDR | Sensor identifier | 0x0000..0xFFFF |
| ... | | | |
| 10 | LName | Long name (up to 30 characters) | "King" |
| ... | ... | ... | |
| 25 | Class | Class of chess piece | 5=King |
| 26 | Player | Player side color: Black/White | 0=White, 1=Black |
| ... | | | |
| 127 | CKSUM | Checksum value (integrity check) | |

Fig. 7C

| Register | Mnemonic | Description | Example value |
|---|---|---|---|
| 0 | UID-H | Unique identifier - high word | 0x0000..0xFFFF |
| 1 | UID-L | Unique identifier - low word | 0x0000..0xFFFF |
| 2 | ADDR | Sensor identifier | 0x0000..0xFFFF |
| ... | | | |
| 10 | LName | Long name (up to 30 characters) | "Shoe" |
| ... | ... | ... | |
| 25 | Class | Class of Monopoly piece | 1=Token |
| 26 | Player | Player having this piece | 2=Player 2 |
| 27 | Value-H | Amount of money assoc. w/token | 0x0000-0xFFFF |
| 28 | Value-L | | 0x0000-0xFFFF |
| ... | | | |
| 127 | CKSUM | Checksum value (integrity check) | |

Fig. 7D

| Register | Mnemonic | Description | Example value |
|---|---|---|---|
| 0 | UID-H | Unique identifier - high word | 0x0000..0xFFFF |
| 1 | UID-L | Unique identifier - low word | 0x0000..0xFFFF |
| 2 | ADDR | Sensor identifier | 0x0000..0xFFFF |
| ... | | | |
| 10 | LName | Long name (up to 30 characters) | "Hotel" |
| ... | ... | ... | |
| 25 | Class | Class of Monopoly piece | 2=Hotel |
| 26 | Player | Player having this piece | 2=Player 2 |
| 27 | Value-H | Rent value associated w/ hotel | 0x0000-0xFFFF |
| 28 | Value-L | | 0x0000-0xFFFF |
| ... | | | |
| 127 | CKSUM | Checksum value (integrity check) | |

Fig. 7E

INTELLIGENT GAME SYSTEM INCLUDING INTELLIGENT FOLDABLE THREE-DIMENSIONAL TERRAIN

CROSS-REFERENCE TO RELATED APPLICATIONS

This application is a continuation in part of U.S. patent application Ser. No. 12/476,888, filed Jun. 2, 2009 and entitled "AN INTELLIGENT GAME SYSTEM FOR PUTTING INTELLIGENCE INTO BOARD AND TABLETOP GAMES INCLUDING MINIATURES," and claims the benefit of U.S. Provisional Patent Application Ser. No. 61/130,878, filed Jun. 3, 2008 and entitled "PUTTING INTELLIGENCE INTO MINIATURES GAMES,", both of which are hereby incorporated by reference in their entirety for all purposes.

FIELD OF THE INVENTION

The present invention relates to the field of board and tabletop games including intelligent foldable three-dimensional terrain. More specifically, the present invention relates to intelligent game systems with intelligent terrain that is able to be folded into a desired three-dimensional structure.

BACKGROUND OF THE INVENTION

Miniatures games are typically played on a board or tabletop on which players control dozens to hundreds of individual miniature figures (usually ranging from ½" to 10"+ in base diameter) in some form of tactical combat simulation. The detail of the tabletop environment, the intricacy of the miniatures and the complexity of the tactical game vary widely between the different games currently available.

All of these games have historically used dice to determine combat outcomes and pen and paper to record the progress, such as how wounded a particular figure is. The emergence of large online worlds like World of Warcraft and Everquest, with complex simulation-level physics and realism, has generated a steady pressure to make these games more sophisticated. However, this has been largely limited by players' reluctance to have to do lots of math on paper. In other words, there is no good way to reproduce the complexity of the combat of online worlds without ruining the feel of tabletop games. One manufacturer, WizKids, Inc., has developed a new type of miniature that has a "decoder-ring"-like base which is moved as the figure becomes wounded. Thus, each miniature keeps track of its own damage, movement, and other game piece information with a simple mechanical system. A window on the base shows the figure's current status and rotating the wheel changes the status as the game progresses. Although the base tracks many items of information, the information is only available as a physical state of the rotational base. Further, updating of the status of the figure is manual, as is scoring. The greater the number of players or game pieces, the more difficult it is to update player status information and scoring. But, game play, particularly for historical re-enactment games is more robust and realistic with a higher number of game pieces. Thus, the very aspect that makes miniatures games exciting to play—diverse and numerous pieces—limits the enjoyment of the game by requiring detailed updates of individual game piece information and scoring.

Enjoyment of traditional table top board games, such as Monopoly® and Sorry®, is similarly affected by extensive record keeping and scoring due to lack of computer awareness of game pieces. For example, in Monopoly®, the value of rent charged to a player who lands on a property depends upon the number of house or hotels on the property and the initial value of the property. The count of cash in the community chest similarly may need to be counted. For a player to make game play decisions, the player often must know the value of their total assets including mortgage value of their properties and available rents, and the value of their cash.

The recent decline in prices of projectors, such as digital light processors (DLP® Texas Instruments), LCD projectors, and flat panel displays, coupled with the need to simplify and facilitate the logistic portion of game play has sparked interest in increasing the interactivity of game play through computer-enhanced graphics and sound. However, the existing miniatures cannot interact with computer graphics for the same reason that a computer game cannot capture the player's information to facilitate scoring and game play. There is no computer-awareness of the miniatures or terrain.

SUMMARY OF THE INVENTION

An intelligent game system is described herein. The intelligent game system comprises one or more sensors, a controller, a projector, one or more game pieces and one or more three-dimensional terrain pieces. The game board and terrain pieces comprise one or more sensors each having an identifier for sensing when a game piece or terrain piece is located on the game board and/or terrain piece. The sensors obtain object information from the game pieces and/or terrain pieces and transfer the object information to a controller. The sensors of the terrain pieces transfer the object information to the sensor of the terrain piece below them until the bottom terrain piece transfer the object information to a game board sensor. The controller is thereby able to track properties of the game and/or terrain pieces, such as position, and adjust the gameplay accordingly.

One aspect of the present application is directed to a three-dimensional terrain for use with a game board. The three-dimensional terrain comprises one or more terrain sensors and one or more levels positioned such that when the three-dimensional terrain is on top of the game board at least one of the one or more levels is substantially elevated above the game board. In some embodiments, the one or more terrain sensors are configured to sense when one or more game pieces are positioned on the one or more levels of the three-dimensional terrain. In some embodiments, the one or more terrain sensors are configured to sense when the one or more game pieces are positioned within the three-dimensional terrain. In some embodiments, the one or more terrain sensors are configured to sense when one or more additional three-dimensional terrains are positioned on top of the one or more levels. In some embodiments, each level corresponds to a different elevation above the game board. In some embodiments, at least one of the three-dimensional terrain and or the additional three-dimensional terrain comprise terrain object information that uniquely identifies the corresponding three-dimensional terrain and or additional three-dimensional terrain. In some embodiments, the terrain object information comprises a terrain identifier that is an RFID tag or a bar code. In some embodiments, the game board comprises one or more game board sensors that can read the terrain object information when the three-dimensional terrain is located on top of one or more of the one or more game board sensors. In some embodiments, when the three-dimensional terrain senses the one or more game pieces or the one or more additional three-dimensional terrains, the three-dimensional terrain communicates the position of the one or more game pieces or the one or more additional three-dimensional terrains to at least one of the one or more game board sensors underneath the three-dimensional terrain.

Another aspect of the present application is directed to a terrain object for use with a game board. The terrain object comprises one or more terrain sensors and one or more folding lines configured to bend such that the terrain object can be arranged into a three-dimensional shape. In some embodiments, the terrain object remains in the three-dimensional shape due to at least one fastener. In some embodiments, when the one or more folding lines are not bent the terrain object is substantially flat. In some embodiments, the one or more terrain sensors are configured to sense when a game piece is positioned on the terrain object. In some embodiments, the game board comprises one or more game board sensors and the terrain object further comprises terrain object information capable of being read by the one or more game board sensors, and further wherein the terrain object information comprises a terrain identifier. In some embodiments, the identifier is a unique identifier. In some embodiments, the unique identifier is an RFID tag or a bar code.

Another aspect of the present application is directed to a terrain object for use with a game board comprising one or more game board sensors. The terrain object comprises terrain object information capable of being read by the one or more game board sensors, and further wherein the terrain object information comprises a terrain identifier. In some embodiments, the identifier is a unique identifier. In some embodiments, the unique identifier is an RFID tag or a bar code.

Yet another aspect of the present application is directed to an intelligent game system. The intelligent game system comprises a game board comprising one or more game board sensors, one or more game pieces each comprising game piece object information capable of being read by the game board sensors, one or more three-dimensional terrains each having one or more levels and one or more terrain sensors, wherein the one or more levels are positioned such that when one of the three-dimensional terrains is on top of the game board at least one of the one or more levels is substantially elevated above the game board, interface electronics coupled to receive the game piece object information from each game board sensor, a controller coupled to receive the game piece object information of each game board sensor from the interface electronics, and to associate the game piece object information with a portion of an image, a computer readable media, programmed with instructions for implementing a game, and configured to be read by the controller and a projector, coupled to receive image information from the controller, wherein the projector receives image information from the controller and projects the image onto the surface of the game board sensors based on the image information received from the controller. In some embodiments, the one or more terrain sensors are configured to sense when one or more game pieces are positioned on the one or more levels of the three-dimensional terrain. In some embodiments, the one or more terrain sensors are configured to sense when the one or more game pieces are positioned within the one or more three-dimensional terrains. In some embodiments, each level corresponds to a different elevation above the game board. In some embodiments, the one or more terrain sensors are configured to sense when one or more additional three-dimensional terrains are positioned on top of the one or more levels. In some embodiments, when the one or more three-dimensional terrains sense the one or more game pieces or the one or more additional three-dimensional terrains, the three-dimensional terrain communicates the position of the one or more game pieces or the one or more additional three-dimensional terrains to at least one of the one or more game board sensors located underneath the three-dimensional terrain. In some embodiments, at least one of the one or more three-dimensional terrains and or the one or more additional three-dimensional terrains comprise terrain object information that uniquely identifies the corresponding three-dimensional terrain and or additional three-dimensional terrain. In some embodiments, the terrain object information comprises a terrain identifier that is an RFID tag or a bar code. In some embodiments, the one or more game board sensors that can read the terrain object information when the one or more three-dimensional terrains are located on top of one or more of the one or more game board sensors. In some embodiments, the one or more three-dimensional terrains further comprise one or more folding lines configured to bend such that the one or more three-dimensional terrains can be arranged into three-dimensional shapes. In some embodiments, at least one of the one or more three-dimensional terrains further comprise terrain object information capable of being read by the one or more game board sensors. In some embodiments, the terrain object information and game piece object information comprise identifiers. In some embodiments, the projector adjusts the image based on the position of the one or more three-dimensional terrains. In some embodiments, each of the one or more game board sensors correspond to a portion of the image.

Another aspect of the present application is directed to a three-dimensional terrain for use with a game board having one or more game board sensors. The three-dimensional terrain comprises one or more levels positioned such that when the three-dimensional terrain is on top of the game board at least one of the one or more levels is substantially elevated above the game board, one or more terrain sensors, terrain object information capable of being read by the one or more game board sensors, wherein the terrain object information comprises a terrain identifier and one or more folding lines configured to fold such that the three-dimensional terrain is able to form a three-dimensional shape. In some embodiments, the one or more terrain sensors are configured to sense when a game piece is positioned on the one or more levels of the three-dimensional terrain. In some embodiments, the one or more terrain sensors are configured to sense when a game piece is positioned within the three-dimensional terrain. In some embodiments, each level corresponds to a different elevation above the game board.

BRIEF DESCRIPTION OF THE DRAWINGS

FIG. 7A illustrates a memory map of nonvolatile memory within an intelligence game piece object for a combat game.

FIGS. 7B and 7C illustrate a memory map of nonvolatile memory within an intelligence game piece object for a chess game.

FIGS. 7D and 7E illustrate a memory map of nonvolatile memory within an intelligence game piece object for a Monopoly® game.

DETAILED DESCRIPTION OF THE DRAWINGS

A system for putting intelligence into board and tabletop games including miniatures comprises one or more sensors to read object information from an object. In some embodiments, each sensor has an address. In some embodiments, the sensors are identified by names, or time slots, or are mapped to input ports of a controller. Interface electronics receive the object information from each sensor, a controller receives the object information and the sensor address for each sensor, and associates the object information with the sensor address. In some embodiments, the controller associates the object information with a portion of an image. A computer readable media is programmed with instructions for implementing a game, and is read by the controller. The system further comprises a projector which receives image information from the controller, and projects the image information. The controller processes the object information to update a changing image, and to transmit image information to the projector. In some embodiments, the system further comprises an object having object information. In some embodiments, the system further comprises speakers, and a removable computer readable media. The removable computer readable media is able to be any appropriate memory device, such as a flash memory stick, SIMM memory card, a compact disk, a magnetic disk, digital video disk, or a game cartridge.

Intelligent Game System

Figure 1A:
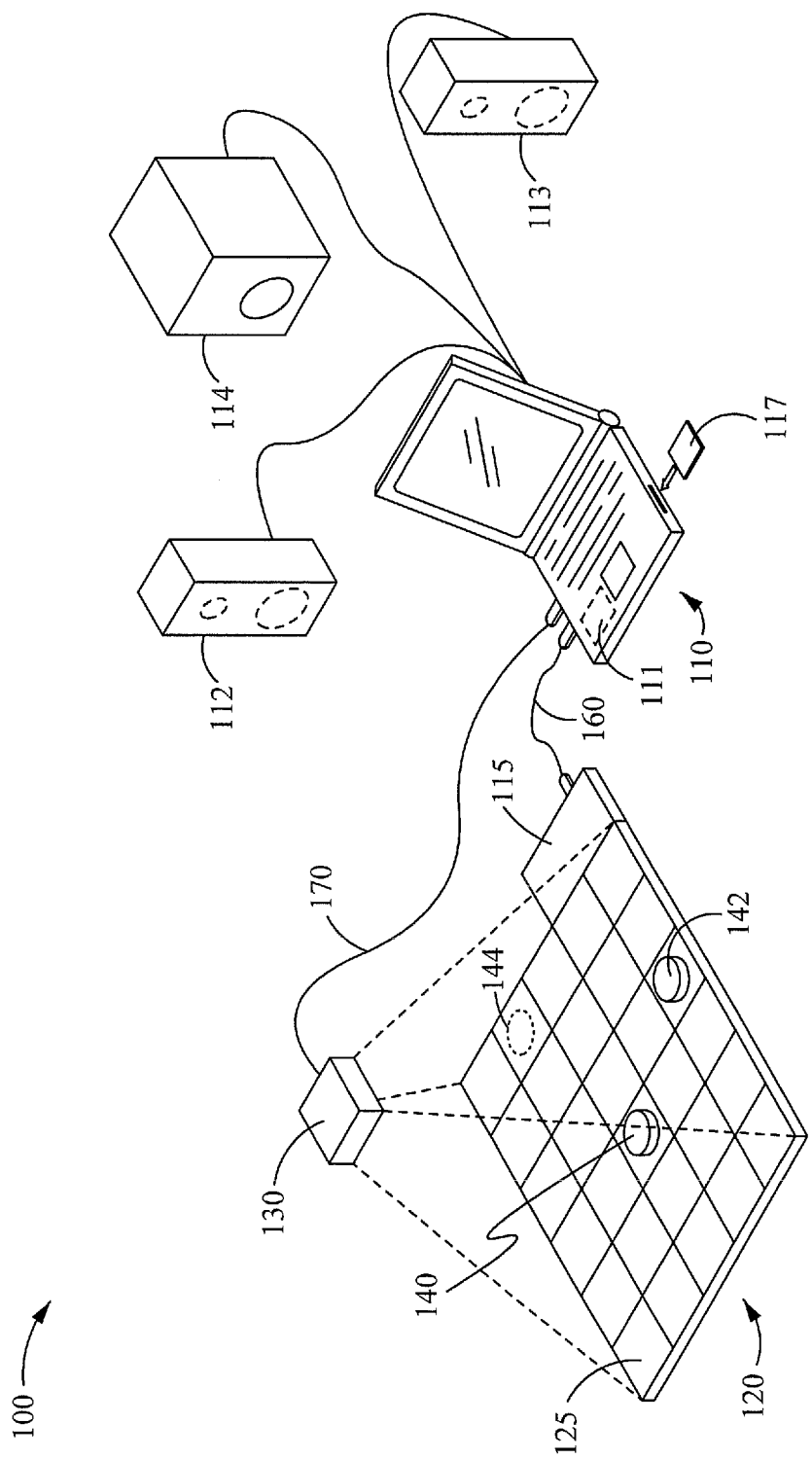
FIG. 1A illustrates a diagram of an intelligent game system for putting intelligence into board and tabletop games including miniatures according to some embodiments.

FIG. 1A illustrates a system for putting intelligence into board and tabletop games including miniatures 100 comprising one or more sensors 120, interface electronics 115, a controller 110, a computer readable media 111, a removable computer readable media 117, a projector 130, speakers 112, 113, and 114, interconnection cables 160 and 170, intelligent games piece objects 140 and 142, and a virtual game piece object 144 according to some embodiments. As the embodiment is explained, below, it will be clear to one skilled in the art that any number and type of intelligent game piece objects are able to be used, depending upon such variables as the actual game being played and the number of game players.

The sensors 120 comprise one or more sensors such as sensor 125. In some embodiments, each sensor 125 comprises a single type of sensor. In some embodiments, each sensor 125 comprises a plurality of different sensor types. Although all of the illustrations, FIG. 1A through 1F, show the sensors 120 organized as a rectangular array of sensors 125, the sensors 125 are able to be arranged in any physical arrangement. The identifier of each sensor 125 in the one or more sensors 120 is decoded within the interface electronics 115. Each sensor corresponds to a portion of an image to be projected by the projector 130. The interface electronics 115 are coupled to the controller 110 via the sensor interface cable 160. The interface electronics 115 create a high level interface between the sensors 120 and the controller 110. The interface electronics 115 manage the sensors 125 such that any object information related to the intelligent game piece objects, 140 and 142, sensed by a sensor 125, is transmitted to the controller 110 via the sensor interface cable 160. In some embodiments, the sensor interconnect cable 160 is an industry-standard USB cable utilizing communications messages which conform to any of the applicable standards such as USB 1.1, 2.0 or the emerging USB 3.0.

In some embodiments, the controller 110 is any commercially available personal computer. In some embodiments, the controller is able to be a single board computer, a personal computer, a networked computer, a cell phone, a personal digital assistant, a gaming console, a portable electronic entertainment device or a portable electronic gaming device. The controller 110 contains a computer readable media 111 programmed with instructions to respond to changes in the object information of an object 140, sensed by a sensor 125 within the one or more sensors 120. In some embodiments, game state information is able to be transferred to intelligent game piece objects 600 as object information. One skilled in the art will recognize that programmed instructions comprise a software application which contains the logic, game rules, scoring, sound, graphics, and other attributes of game play for playing an interactive game with intelligence as disclosed herein. The application software processes the object information received from the interface electronics 115 and transmits image information of a changing image to the projector 130. In some embodiments, the intelligent game piece objects 600 transmit their object information to the controller 110 via a wireless router 150 or directly to the controller 110 equipped with a wireless interface 116.

In some embodiments, the projector 130 projects an image onto the entire surface area of the sensors 120. In some embodiments, the projector 130 projects an image representing an object 140, along with other game images, onto any surface. In some embodiments, the projector further projects an image of one or more virtual game piece objects 144. In some embodiments, the projector 130 projects the image onto a portion of the surface area of the sensors 120. In some embodiments, the projector 130 is a DLP® (Texas Instruments) projector. In other embodiments, the projector 130 is any projection device capable of receiving image information and projecting an image onto the surface area of the sensors 120, such as any of the commercially available LCD projectors. The application software further provides sound via the speakers 112, 113, and 114 which are coupled to the controller 110. As described further below, in some embodiments the controller 110 is able to communicate directly, or indirectly, with the intelligent game piece objects 600 to implement the functionality within the intelligent game piece objects 600. In some embodiments, game state information is able to be stored on the removable computer readable media 117 or on the computer readable media 111 within the controller 110, thereby enabling resumption of a game in progress at a later date on the same intelligent game system or on a different intelligent game system. One skilled in the art would recognize that such game state information is able to be conveyed to other intelligent game systems 100 by, for example, transfer via the internet, through email, or by uncoupling and transporting the controller 110 to another location for coupling to another intelligent game system 100. In the case of powered intelligent game piece objects 600, game state information may further be stored within the powered intelligent game piece objects 600.

Figure 1B:
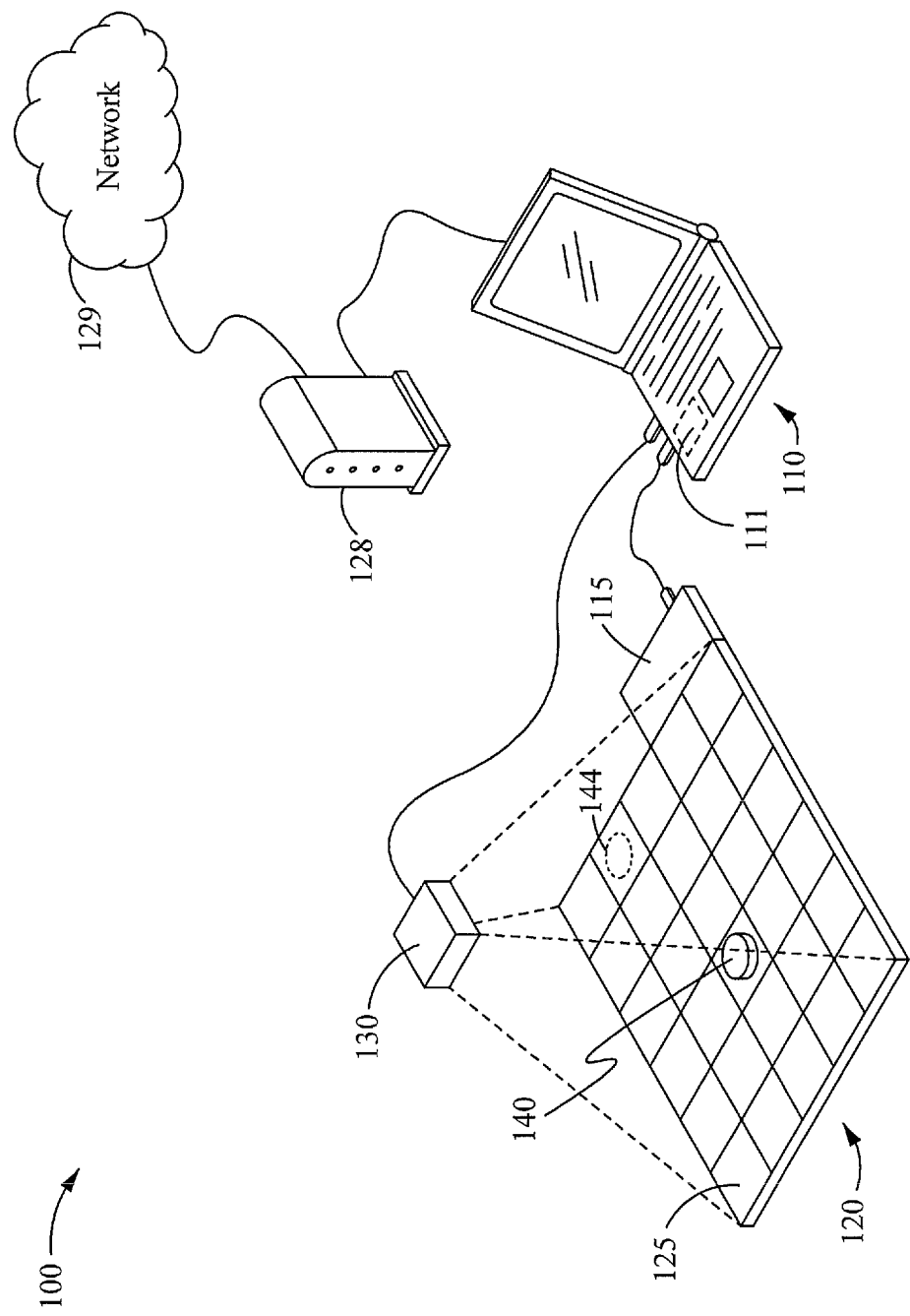
FIG. 1B illustrates a diagram of an intelligent game system for putting intelligence into board and tabletop games including miniatures according to some embodiments.

FIG. 1B illustrates a diagram of a system for putting intelligence into board and tabletop games including miniatures supporting remote play of an intelligent game system according to some embodiments. A network access device 128, such as a cable modem or DSL modem, is operably coupled to the controller 110 and to a network 129. Remote player game pieces are able to appear as virtual game piece objects 144, projected onto the surface area of the sensors 120.

Figure 1C:
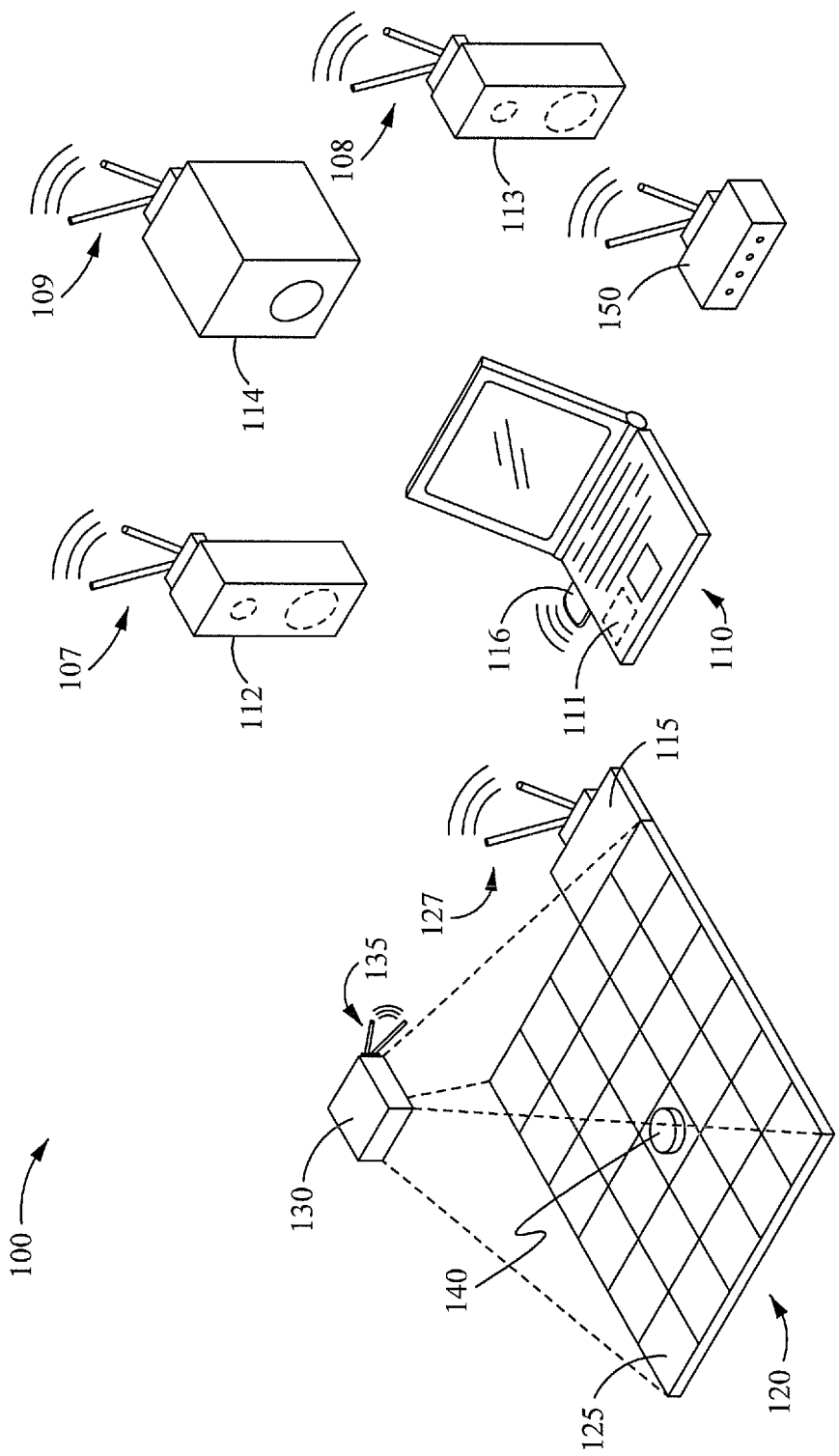
FIG. 1C illustrates a diagram of an intelligent game system for putting intelligence into board and tabletop games including miniatures according to some embodiments.

FIG. 1C illustrates a diagram of a system for putting intelligence into board and tabletop games including miniatures supporting wireless interconnection of system elements according to some embodiments. The sensors 120 with interface electronics 115 further comprise a wireless adapter 127. The speakers 112, 113, and 114 further comprise wireless adapters 107, 108 and 109 respectively. The controller 110 further comprises a wireless adapter 116 for receiving object information from the sensors 120 and for transmitting image information of a changing image to the projector 130 having a wireless adapter 135. Each wireless adapter 107, 108, 109, 116, 127, and 135 is further able to communicate via a wireless router 150. In some embodiments, the controller 110 is able to transmit sound information to speakers 112 through 114 via one or more wireless adapters.

Figure 1D:
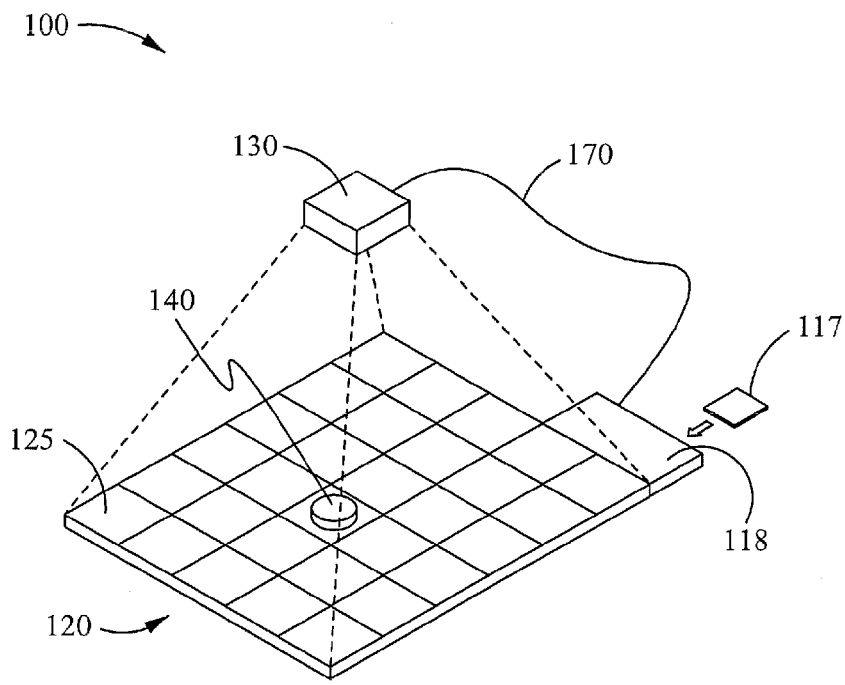
FIG. 1D illustrates a diagram of an intelligent game system for putting intelligence into board and tabletop games including miniatures according to some embodiments.

FIG. 1D illustrates a diagram of a system for putting intelligence into board and tabletop games including miniatures wherein the controller and the interface electronics are merged onto a single controller 118 according to some embodiments. The single controller 118 is able to be physically integrated with the sensors 120 or is able to be physically separate from the sensors 120. The interface controller 118 is able to further comprise a removable computer readable media 117 such as a SIMM card or a USB memory stick, game cartridge, magnetic disk, digital video disk, compact disk or other portable removable media. In these embodiments, the interface controller 118 receives object information from the sensors 120 via its own interface electronics. The game application software is able to be resident on the computer readable media 111 within the controller 118, or on a removable computer readable media 117. The game application software processes the object information received from the sensors 120 and transmits the image information of a changing image to the projector 130.

Figure 1E:
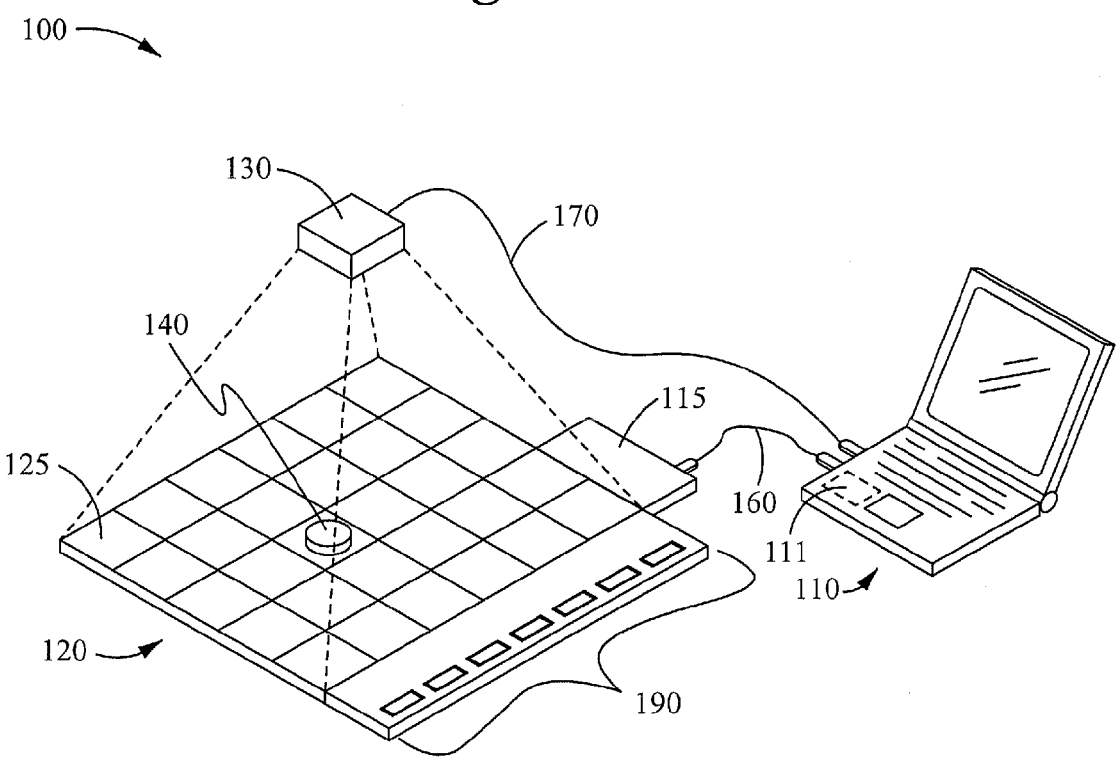
FIG. 1E illustrates a diagram of an intelligent game system for putting intelligence into board and tabletop games including miniatures according to some embodiments.

FIG. 1E illustrates a diagram of a system for putting intelligence into board and tabletop games including miniatures comprising one or more switches or buttons 190 according to some embodiments. The switches or buttons 190 are able to include dedicated functionality, such as a "Start" or "Reset" button, and switches or buttons 190 are further able to include programmable functionality such as programmable function keys F1 through F4. One skilled in the art will recognize that the switches or buttons are able to be implemented in a variety of technologies such as mechanical switches, capacitive switches, membrane switches, and the like. The switches or buttons 190 are able to be physically a part of the structure of the sensors 120 or the switches or buttons 190 are able to be a separate physical structure from the sensors 120. The switches or buttons 190 are interfaced to the interface electronics 115 and received by the controller 110 via the sensors interface cable 160.

Figure 1F:
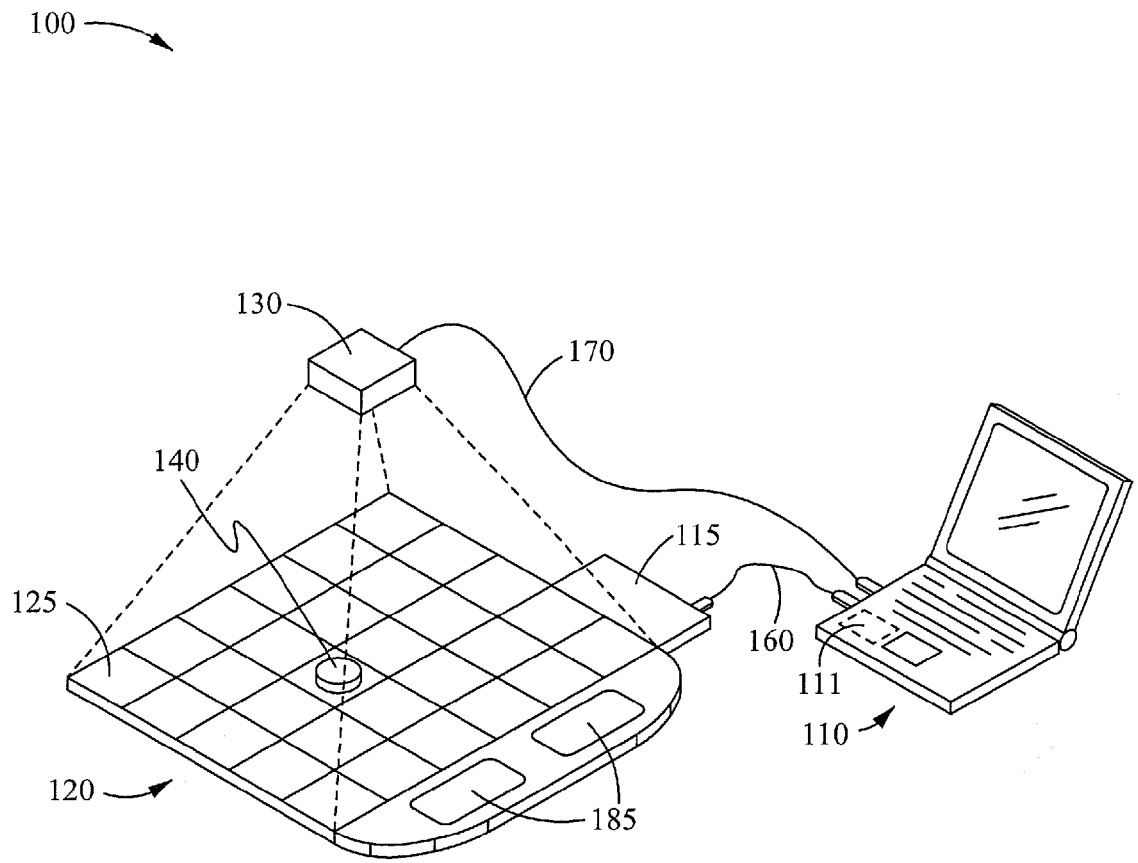
FIG. 1F illustrates a diagram of an intelligent game system for putting intelligence into board and tabletop games including miniatures according to some embodiments.

FIG. 1F illustrates a diagram of a system for putting intelligence into board and tabletop games including miniatures comprising one or more touch screens 185 according to some embodiments. Touch screens 185 are able to be physically a part of the structure of the sensors 120 or a separate physical structure from the sensors 120. The controller 110 transmits information to a touch screen 185, and receives information from a touch screen 185, via the electronics interface 115.

Figure 1G:
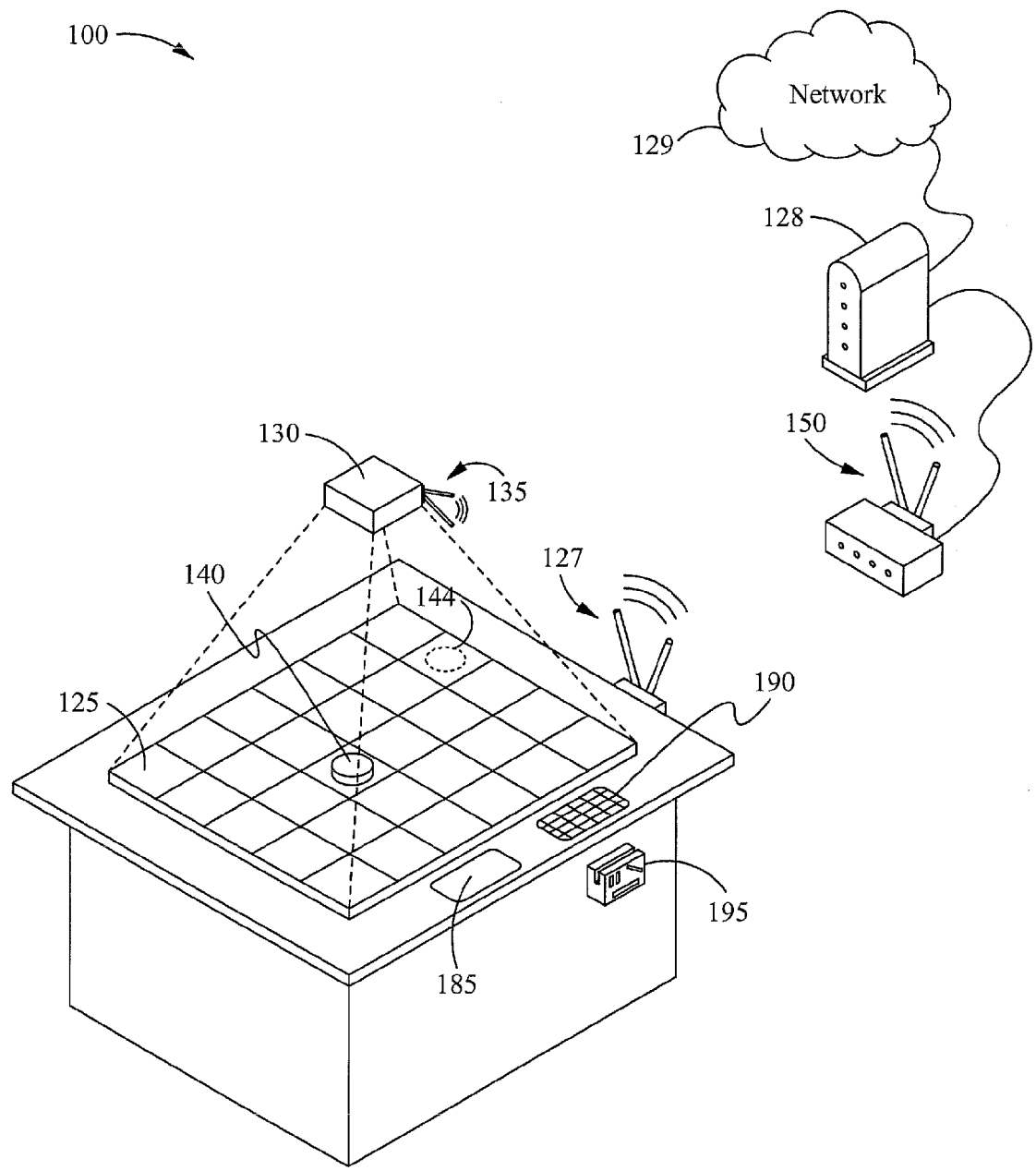
FIG. 1G illustrates a diagram of an intelligent game system for putting intelligence into board and tabletop games including miniatures according to some embodiments, configured for use in amusement or arcade environments.

FIG. 1G illustrates a diagram of a system for putting intelligence into board and tabletop games including miniatures comprising a payment system 195 according to some embodiments. FIG. 1G is exemplary of an arcade or amusement configuration. Payment system 195 comprises a magnetic swipe card slot, a cash reader/scanner, token accepting slots and a return button. One skilled in the art will recognize that any combination of the listed payment methods may be available commercially as an add-on module to the intelligent game system. Additional switches or buttons 190 are able to be used to check login credentials by logging on to a remote system to enable payment by an account or with micro-cash. Touch screen 185 may be used to display login keystrokes. In addition, touch screen 185 is able to be used as a login input device instead of additional switches or buttons 190. In some embodiments, system components are coupled via wireless communications devices 135 (projector), 150 (router) and 127 (sensors and controller). Wireless router 150 is able to be further coupled to a DSL or cable modem 128 and further coupled to a network 129, such as the Internet, enabling electronic payment features and remote game play.

Figure 2A:
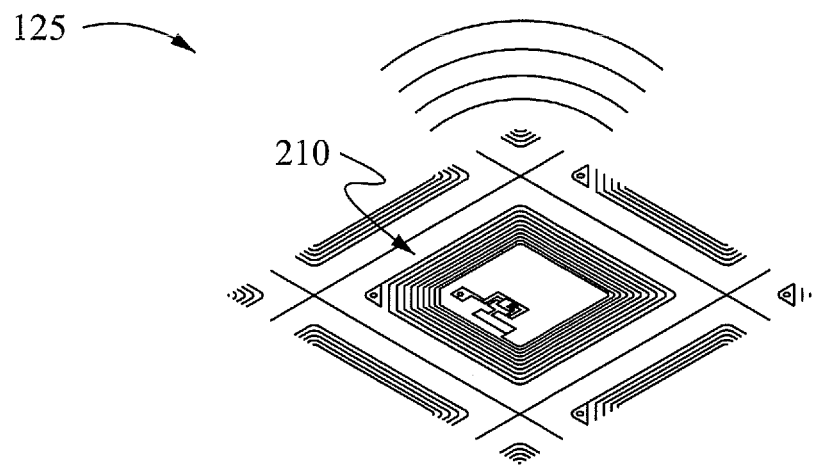
FIG. 2A illustrates a diagram of a RFID reader as a sensor in the one or more sensors according to some embodiments.
Figure 2B:
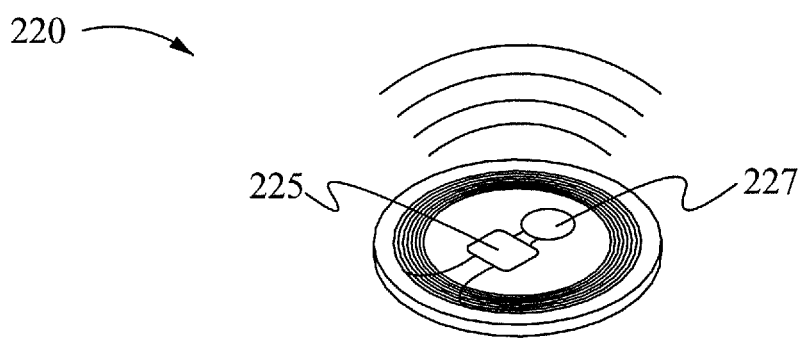
FIG. 2B illustrates a diagram of an object containing an active RFID tag according to some embodiments.
Figure 2C:
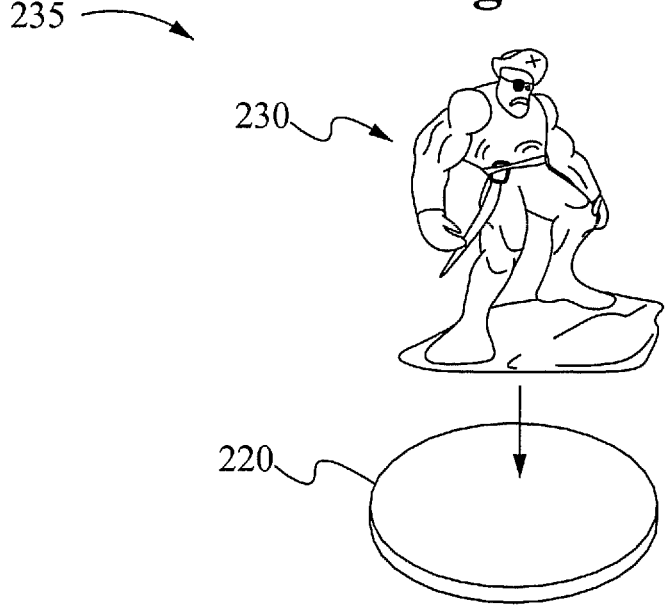
FIG. 2C illustrates a diagram of an existing game piece mounted on an object containing an RFID tag according to some embodiments.

FIG. 2A illustrates a sensor 125 according to some embodiments. The sensor comprises a RFID reader 210 with associated antenna. In some embodiments, low voltage electrical power is available within the sensors 120. FIG. 2B illustrates an object 220 according to some embodiments comprising an inexpensive, commercially available RFID tag 225 wherein the tag is passive. In some embodiments, the RFID tag 225 is an active tag, and optional battery 227 is included in the object 220. In some embodiments, an active RFID tag comprises, for example, an Atmel® Asset Identification EEPROM part number AT24RF08C. The Atmel part has 1K bytes of on-board EEPROM, a nonvolatile memory, with which to store object information in addition to the RFID tag. FIG. 2C illustrates affixing the object 220 to an existing game piece miniature 230 to create an intelligent game piece object 235. The object 220 is lightweight, and thus any readily available adhesive, such as Elmer's Glue™, two-sided tape, rubber cement, model glue, or epoxy, will serve to affix the object 220 to the existing game piece miniature 230. It will be clear to one of skill in the art that the RFID tag is also able to be mechanically coupled to the existing game piece.

Figure 2D:
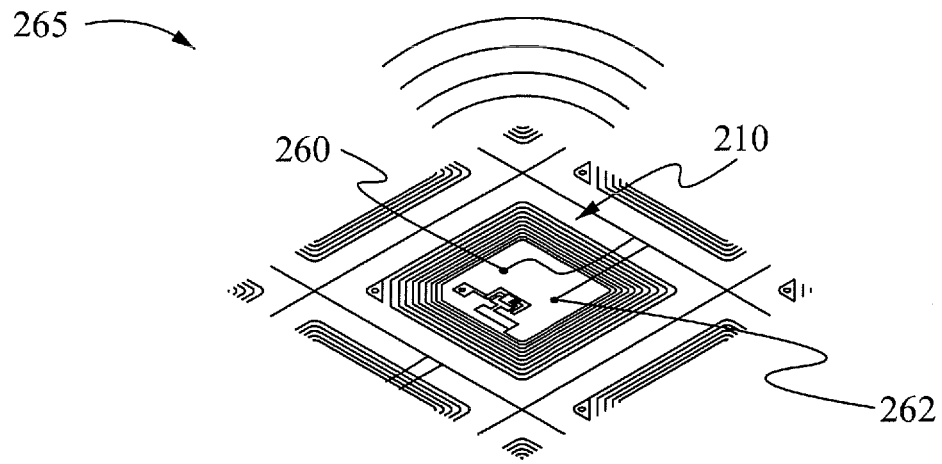
FIG. 2D illustrates an active RFID reader and electrical contacts according to some embodiments.
Figure 2E:
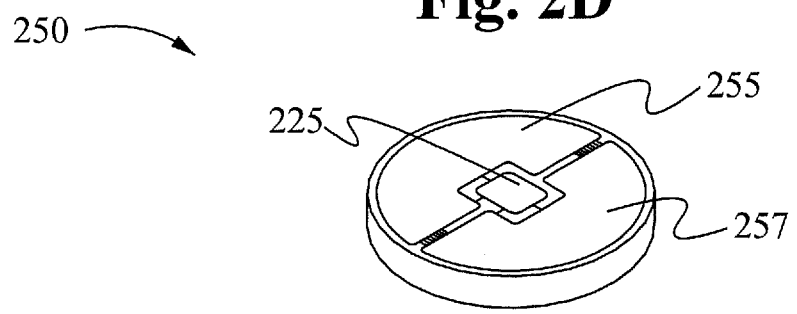
FIG. 2E illustrates an object with an RFID tag and electrical contacts according to some embodiments.
Figure 2F:
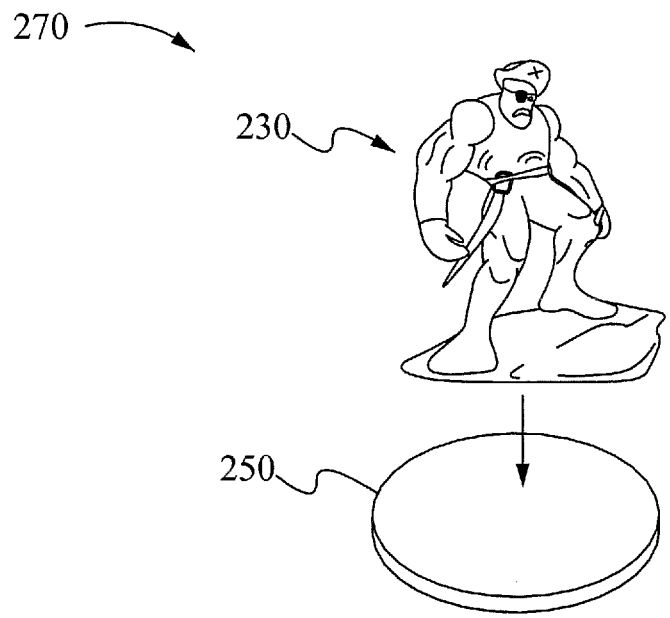
FIG. 2F illustrates an existing game piece mounted on an object containing an RFID tag with electrical supply contacts to the object according to some embodiments.

FIG. 2D illustrates a sensor with a power supply 265 according to some embodiments. A sensor with a power supply 265 comprises a RFID reader 210 and positive and negative electrical contacts 260 and 262. According to some embodiments, FIG. 2E illustrates a powered object 250 comprising either a passive or active RFID tag 225, and hemispherically shaped electrical contact plates 255 and 257. The exact shape of the electrical contact plates 255 and 257 is able to vary, so long as the electrical contact plate shape accommodates a substantial variability in orientation of the powered object 250 placed on the powered sensor 265 electrical contacts 260 and 262. FIG. 2F illustrates affixing the powered object 250 to an existing game piece miniature 230 to create a powered intelligent game piece object 270 according to some embodiments. The powered object 250 is lightweight, and thus any readily available adhesive will serve to affix the powered object 250 to the existing game piece miniature 230.

Figure 2G:
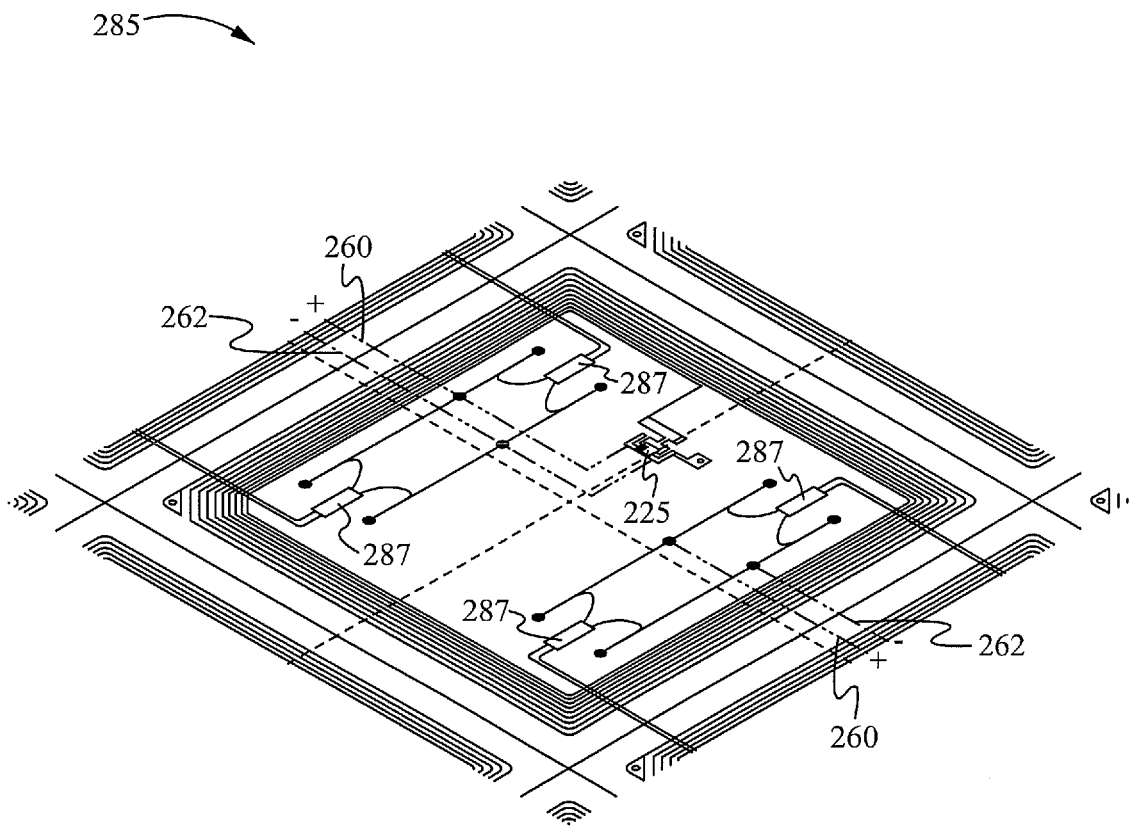
FIG. 2G illustrates an object containing an active RFID reader and Hall-effect sensors with electrical supply contacts according to some embodiments.

FIG. 2G illustrates one or more sensors according to some embodiments. The sensors comprise one or more sensors of a first type and one or more sensors of a second type. The functionality of the sensors of the first type and the sensors the second type are able to differ. In some embodiments, sensors of the first type are sensors which detect at least the presence of an object, such as a Hall-effect sensor, an opto-detector, a mechanical switch such as a pogo-pin, or an electrical contact such as making or breaking a circuit. Sensors of the second type are, for example, RFID readers, or bar code scanners. Embodiments of this type use the sensors of the first type to detect the presence of an intelligent game piece object and use the sensors of the second type to obtain object information. In some embodiments, one or more sensors comprise a sensor of the first type for each location for which detection of an object's presence is desired, and subsequently apply power to the powered intelligent game piece object to enable transfer of its object information to a single sensor of the second type. Sensors of the second type include RF transceivers, wireless b 802G receivers, pulsed infra-red light receptors and serial communications modules.

Figure 2H:
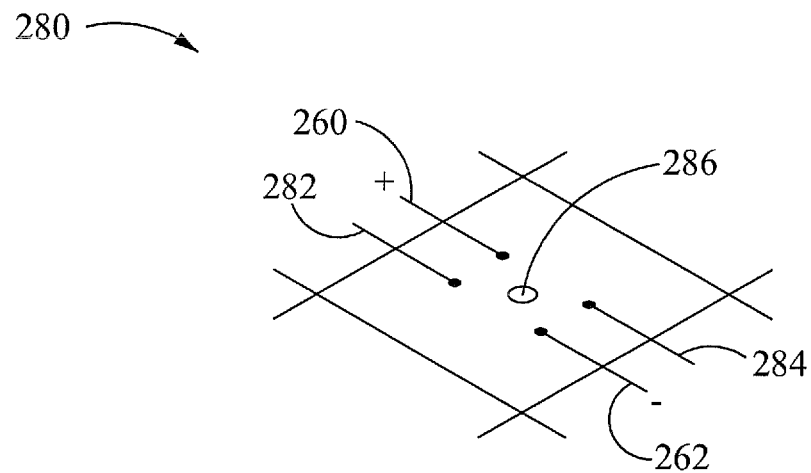
FIG. 2H illustrates a sensor with an optical detector, electrical supply contacts and communication contacts according to some embodiments.
Figure 2I:
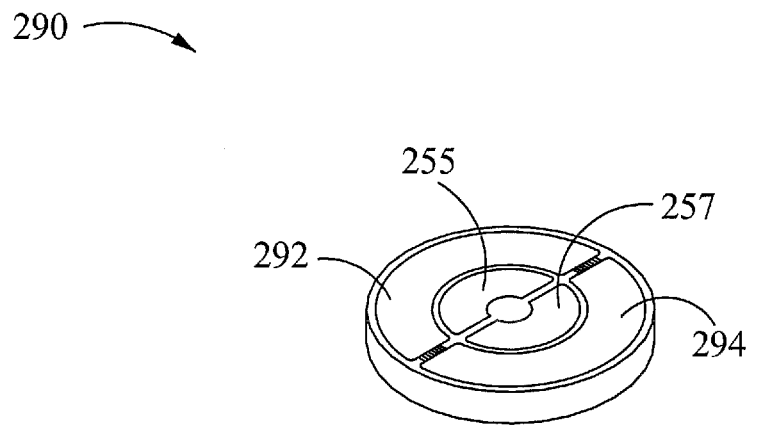
FIG. 2I illustrates an object with electrical contacts and communication contacts according to some embodiments.

FIG. 2H illustrates a diagram of a sensor according to some embodiments. An optical powered sensor 280 comprises electrical contacts 260 and 262, communications contacts 282 and 284, and an opto-detector 286. The opto-detector 286 is a sensor of the first type, as described above. The opto-detector 286 detects the presence of a powered object 290 by occlusion of light when a powered object 290 is placed on a sensor 280. Power is then applied to the powered object 250 via the electrical contacts 260 and 262. On "wake-up" of the processor or controller 610 on the intelligent game piece object 600, or by polling by the interface electronics 115 or by the controller 110, the processor or controller 610 (FIGS. 6B and 6C) drives a message onto the communication pin 292 thereby transmitting object information to a sensor of the second type. In some embodiments, a sensor of the second type is able to be a single serial communications circuit. FIG. 2I illustrates a diagram of a powered intelligent game piece object 290 according to some embodiments. The powered object 290 is able to be used with sensors of two types as described above. One skilled in the art would recognize that a wide variety of sensors of the second type (communication) are contemplated. Further, one skilled in the art would recognize that a wide variety of sensors of the first type (presence) are also contemplated.

In the description which follows, the term "sensor" will refer to a sensor 125 or powered sensor 265, 280 or 285, unless a distinction is noted. The term "object" will refer to an object 220 or a powered object 250 or 290 unless a distinction is noted. The term "intelligent game piece object" will refer to intelligent game piece object 235 or powered intelligent game piece object 270, unless a distinction is noted.

Figure 3:
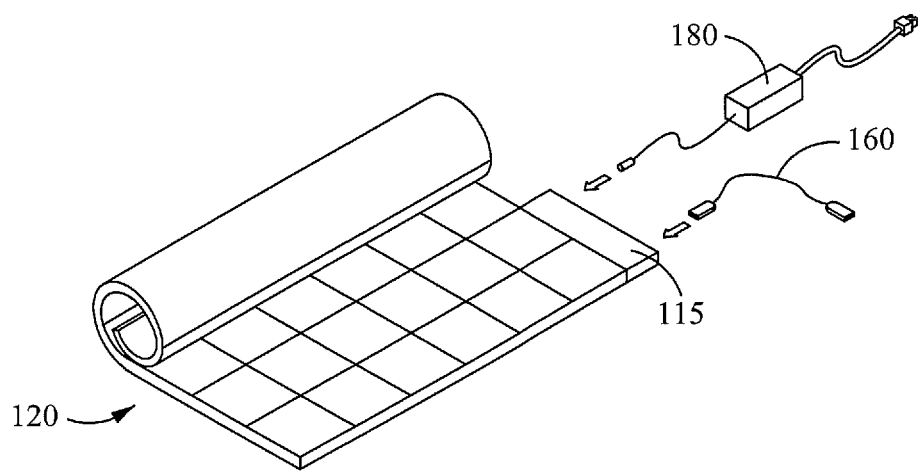
FIG. 3 illustrates a flexible version of the one or more sensors according to some embodiments.

FIG. 3 illustrates one or more sensors according to some embodiments. The sensors are able to be encased in a flexible, portable structure enabling the sensors to be conveniently rolled up for easy transportation. In some embodiments, an AC power adapter 180 supplies low voltage power to the sensors and to the interface electronics 115. In other embodiments, a battery or power storage system is used to provide power to the sensors and to the interface electronics 115. The sensor interface cable 160 couples the interface electronics 115 to the controller 110.

Figure 4:
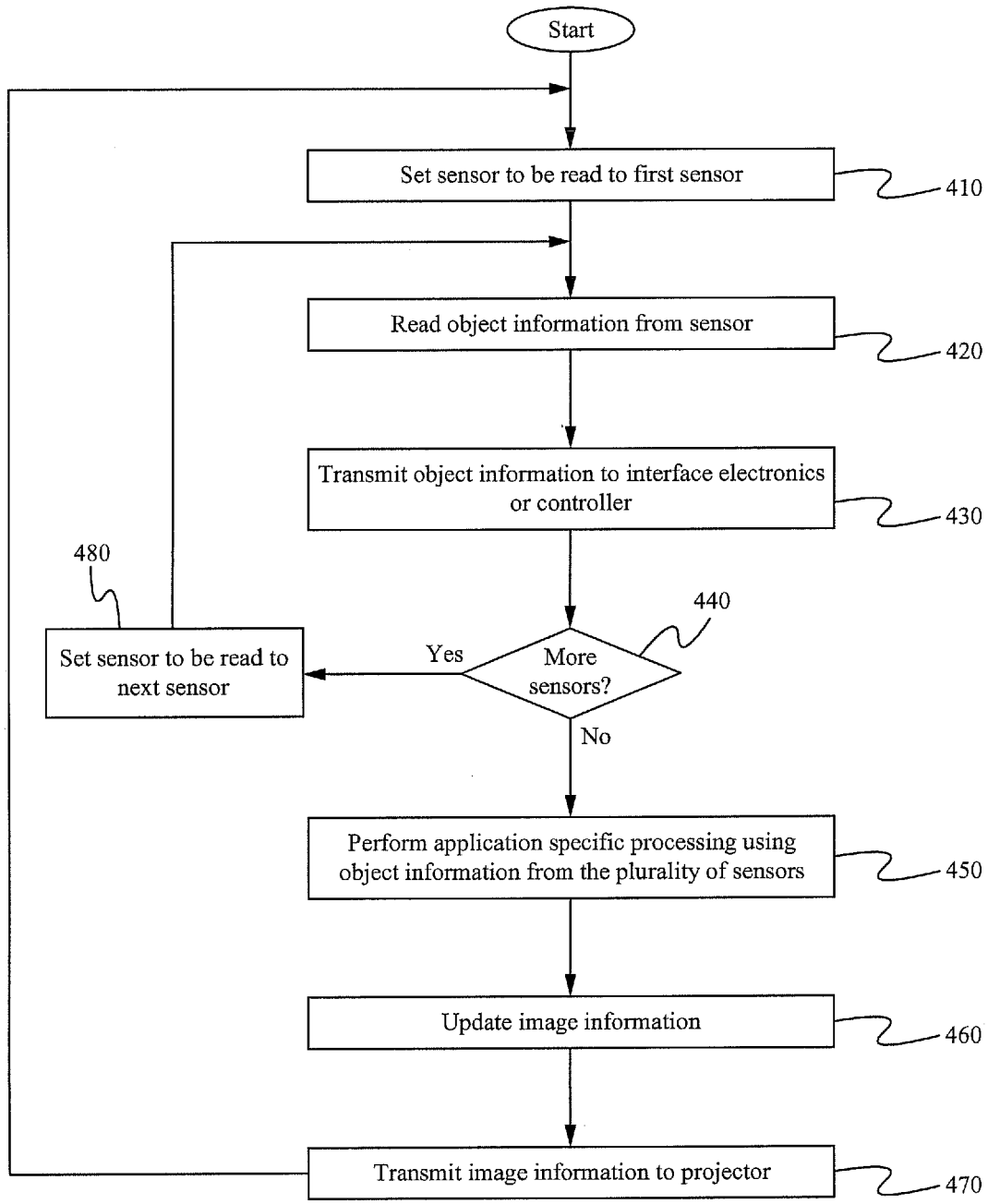
FIG. 4 illustrates a process to update a changing image in response to changes in an object's location based on object information obtained from the sensors.

FIG. 4 illustrates a method of updating a changing image and transmitting the image to a projector 130 according to some embodiments, using sensors of only one type. It will be recognized by one skilled in the art, that the method described below is able to be implemented within the controller 110, the interface electronics 115, or the combined interface electronics and controller 118. At step 410, the sensor to be read is set to the first sensor. In some embodiments, the sensor to be read is determined by a sensor address. In some embodiments, the sensor to be read is determined by other identification methods, such as a name, time slot, or mapping of the sensor to an input port of the controller. Object information is read from the sensor at step 420. The object information is then transmitted to the interface electronics or controller at step 430. At step 440, if there are more sensors to read, then the method branches to step 480 to set the sensor to be read to the next sensor, then the method continues at step 420. If there are no more sensors to read at step 440, then the application software processes the object information at step 430, and updates the image at step 460. The controller then transmits the image to the projector at step 470. The core game features of an intelligent game system are performed in the application software. Such features include producing graphics and sound, scoring points for game play, and executing the game in accordance with the game rules.

Figure 5:
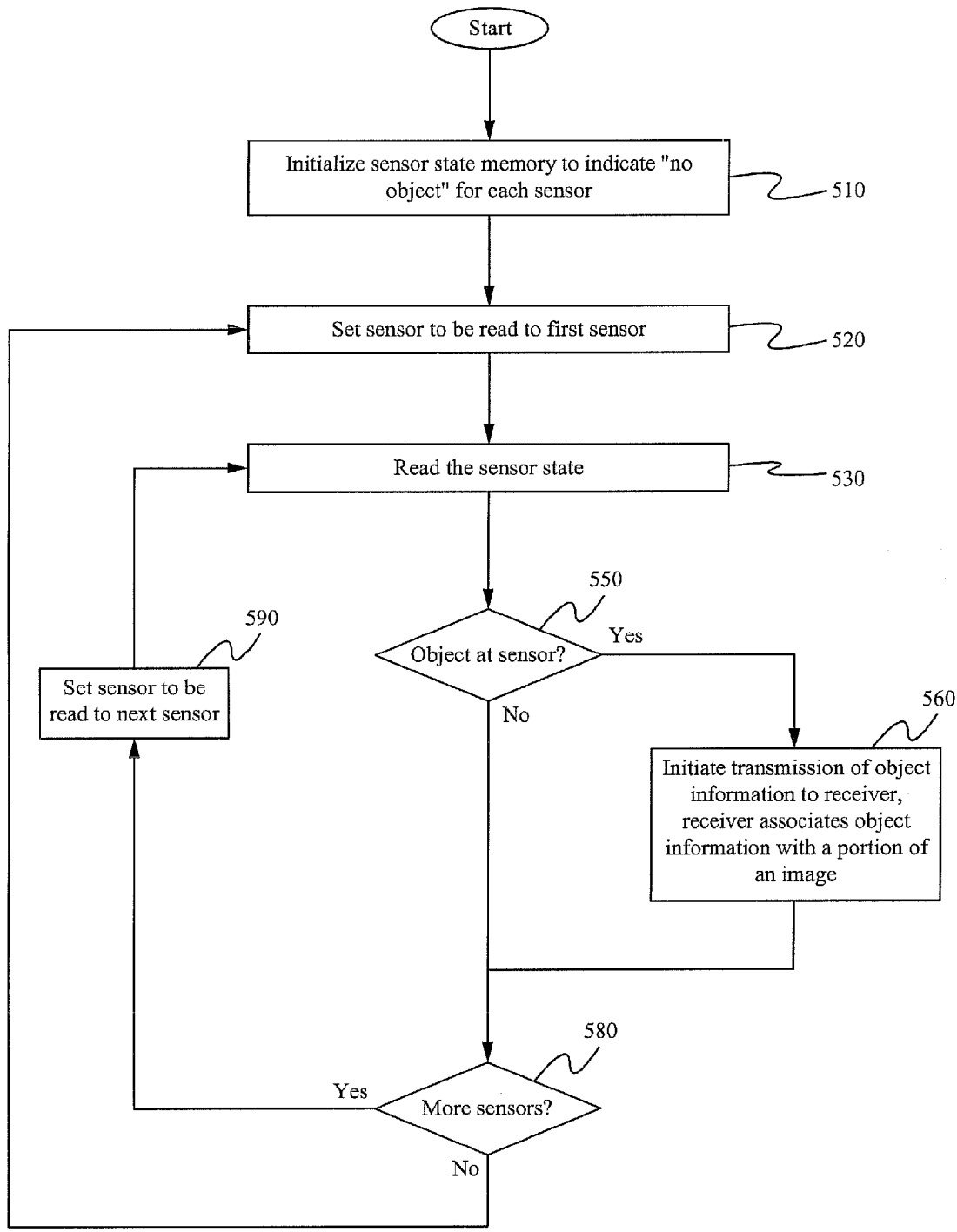
FIG. 5 illustrates a process to associate object information with a portion of an image using one or more sensors.

FIG. 5 illustrates a method of obtaining object information using sensors of two types according to some embodiments. At step 510, a memory to store the state of sensors of the first type is initialized to indicate that "no object" is present at each sensor. At step 520, the sensor to be read is set to the first sensor of the first type. The sensor is read at step 530. If the sensor state has changed at step 540, if an object is detected at the sensor of the first type in step 550, then the object at the sensor initiates transmission of its object information to a sensor of the second type at step 560. The receiver associates the object information with a portion of an image. If no object is at the sensor, then any object information stored for the sensor is deleted at step 570. At step 580, a check is made as to whether there are more sensors. If there are more sensors to check, the sensor to be read is set to the next sensor of the first type, and the sensor is read at step 530. If there are no more sensors to read at step 580, the method continues at step 520 where the sensor to be read is set to the first sensor of the first type.

Intelligent Game Piece Object

Figure 6B:
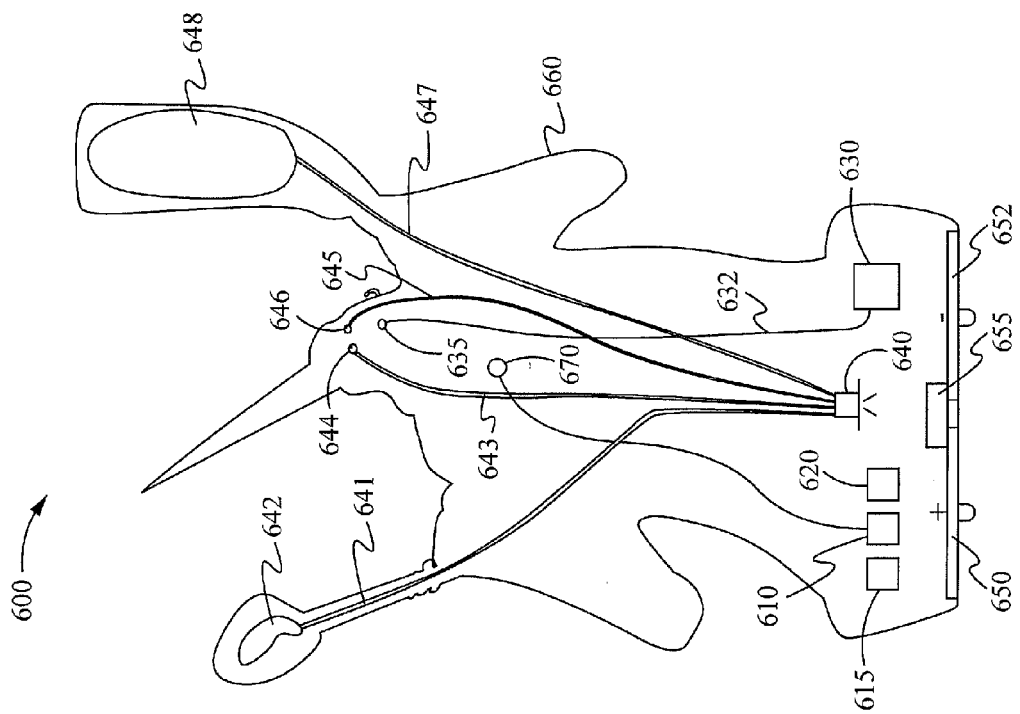
FIG. 6B illustrates an intelligent game piece object according to some embodiments.
Figure 6A:
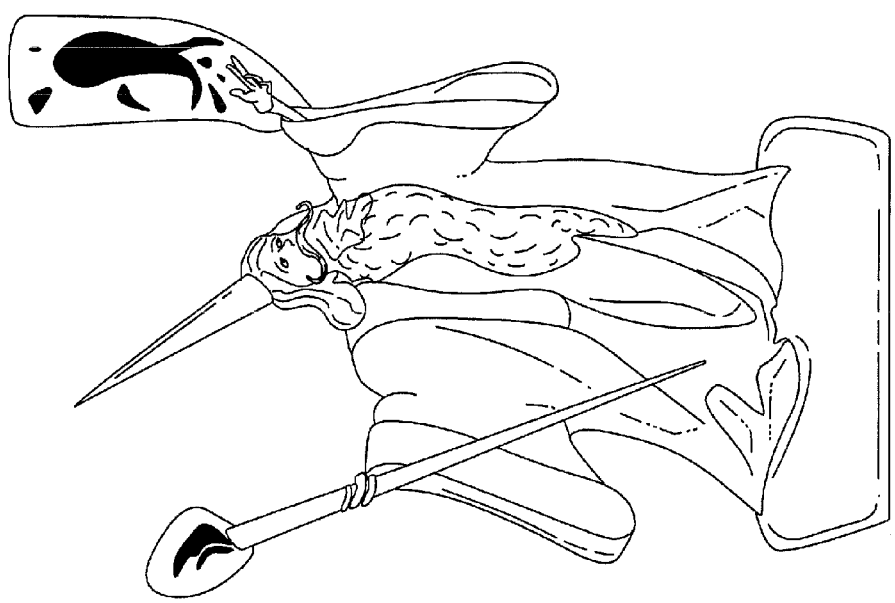
FIG. 6A illustrates a game piece character.

FIG. 6A illustrates an external view of an intelligent game piece object 600. FIG. 6B illustrates internal elements of an intelligent game piece object in accordance with some embodiments. Internal elements of an intelligent game piece object 600 comprise a processor or controller 610. In some embodiments, the intelligent game piece object 600 further comprises one, or more, of a nonvolatile memory 615, a transceiver 620, an audio processor 630, audio distribution equipment 632 and 635, a light emitting source 640, one or more light transmitters 641, 643, 645 and 647, and light diffusers 642, 644, 646 and 648. An intelligent game piece object 600 is able to further comprise an opto-detector 670. The intelligent game piece object 600 further comprises power source contacts 650 and 652. In some embodiments, all components inside the intelligent game piece which require a power source are electrically coupled to the power source contacts 650 and 652. In other embodiments, one or more components of the intelligent game piece object 600 which require a power source are electrically coupled to a battery 655. The processor or controller 610 implements the intelligence of the intelligent game piece object 600. The external features of the intelligent game piece object are embodied in the external skin 660.

Processor

The processor or controller 610 advantageously coordinates the functionality in the intelligent game piece object 600. In some embodiments, the transceiver 620 is operably coupled to the processor or controller 610 to manage transmission and reception of messages. In some embodiments, the audio processor 630 is operably coupled to the processor or controller 610 so that processor or controller 610 is able to configure the audio processor 630 and send the audio processor content and effects for audio processing. In some embodiments, the light emitting source 640 is operably coupled to processor or controller 610 to control the delivery of light.

In some embodiments, the processor or controller 610 comprises a memory store for storing the executable instructions and program variables required to implement the functionality of the intelligent game piece object 600.

Communications

In some embodiments, an intelligent game piece object 600 comprises a communications transceiver 620. The transceiver 620 implements communications between the intelligent game piece object 600 and a receiver of intelligent game piece object information. In some embodiments, a corresponding transceiver is located within the sensors as a sensor of the second type. In other embodiments, the corresponding transceiver is located within the controller 110 (FIG. 1C). The corresponding transceiver is also able to be a wireless router 150 (FIG. 1C). It will be clear to one skilled in the art that the transceiver 620 is able to be a subsystem of the processor or controller 610, or of other elements within the intelligent game piece object 600.

Light Feature

In some embodiments, the intelligent game piece object 600 further comprises a light emitting source 640. The light emitting source 640 comprises, for example, a broadband light bulb, a single wavelength LED or a multi-wavelength LED. In some embodiments, the wavelengths include one or more non-visible wavelengths. The light emitting source 640 is optically coupled to one or more optical transmitters 641, 643, 645, and 647 to distribute light throughout the intelligent game piece object 600. In some embodiments, the optical transmitters include optical fiber of material type and diameter as appropriate for the application and the wavelength transmitted. In some embodiments, the optical transmitters include one or more mirrors. The mirrors are able to be conventional mirrors, precision optics, or micro-mirror arrays. In some embodiments, the one or more optical diffusers 642, 644, 646 or 648 include an opaque or diffusive material of any type such as a polymer resin, frosted glass, or plastic. An optical diffuser is able to be a micro-mirror array for distributing light in a programmable manner.

In some embodiments, the processor or controller 610 selects the wavelength of a multi-wavelength light source 640, or selects from the plurality of light transmitters 641, 643, 645, or 647, determines the on/off time of the light emitting source 640, or provides a pulse train to pulsewidth modulate the light emitting source 640. In some embodiments, the opto-detector 670 is managed by the processor or controller 610 to coordinate with other features of the intelligent game piece object 600 to implement unique game functionality. For example, an intelligent game piece object 600 with an 800 nm (non-visible) light emitting source and an opto-detector 670 which is sensitive to 800 nm light is able to cooperate with the processor or controller 610 to rotate the intelligent game piece object 600 while emitting 800 nm light from the light emitting source 640, and monitoring the opto-detector 670 for reflection of 800 nm light to determine when to stop rotating the intelligent game piece object 600 such that it is facing an opponent's intelligent game piece object.

Sound Feature

In some embodiments, an intelligent game piece object 600 comprises an audio processor 630 which is operably coupled to an audio speaker 635. An audio speaker 635 is able to be a piezo-electric transducer, a conventional cone speaker with magnet and diaphragm, or other suitable audio delivery equipment. Although FIG. 6B shows a single audio speaker 630, located at the mouth of the character of the intelligent game piece object 600, additional or alternate audio configurations would be contemplated by one skilled in the art. In some embodiments, the audio speaker 635 is located in the base, and the audio distribution equipment 632 comprises a hollow tube directed to the location where the audio is to be delivered. In some embodiments, the audio distribution equipment 632 comprises an electrical cable pair, distributing audio to one or more audio speakers 635. In some embodiments, the processor or controller 610 generates audio within the intelligent game object incident to the movement and optical sensing. In some embodiments, the audio processing comprises audio effects such as echo, reverb, phase shifting. In some embodiments, audio processing techniques are implemented in the processor or controller 610 where the processor or controller 610 comprises digital signal processing functionality.

Movement Feature

Figure 6C:
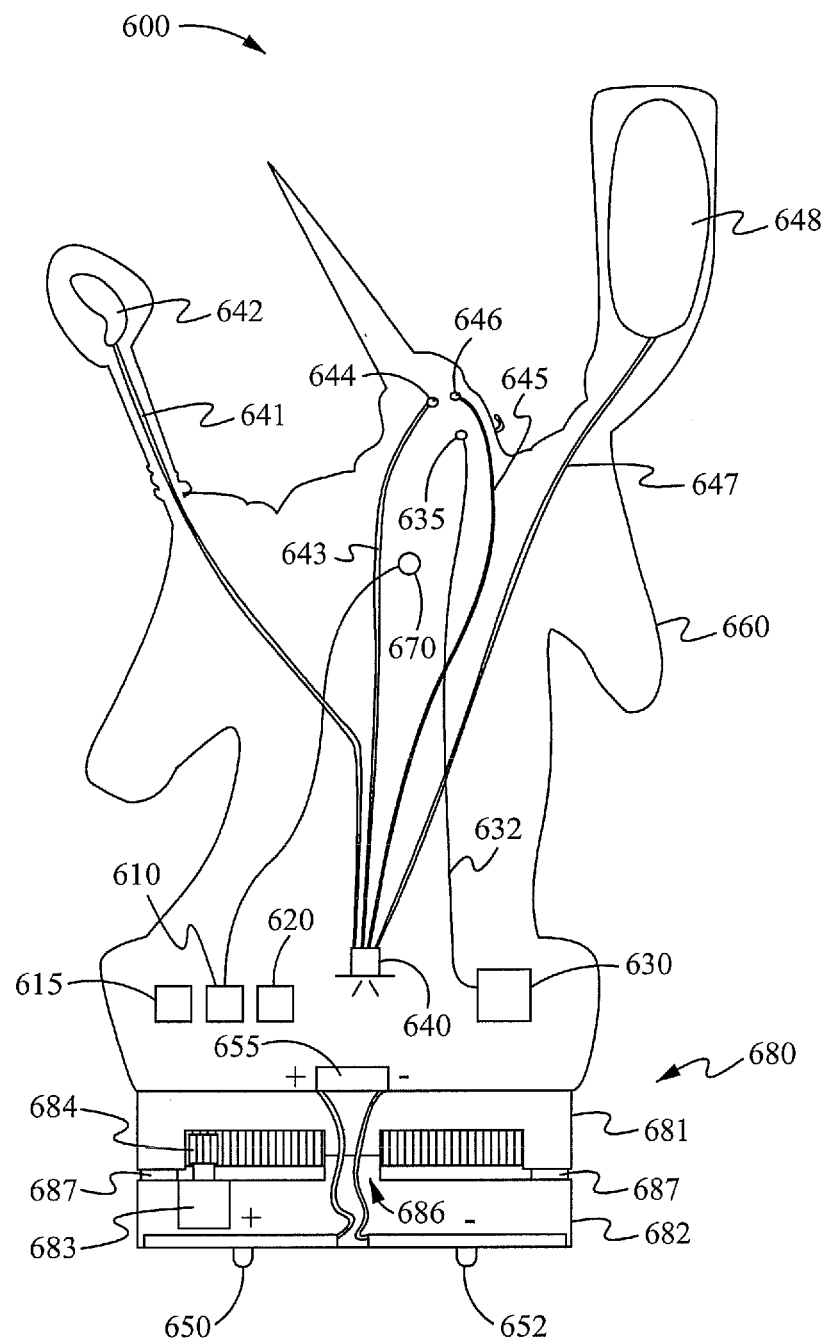
FIG. 6C illustrates a rotating base for a powered intelligent game piece object according to some embodiments.

FIG. 6C illustrates a rotating base for a powered intelligent game piece object according to some embodiments. The rotating base 680 comprises a top half of the base 681 and a bottom half of the base 682, rotatably coupled via a pivot 686. The top half of the base 681 is driven by a motor 683 in the bottom half of the base 682. The motor has a driving gear head or friction capstan drive 684 which drives the top half of the base 681. The top half of the base 681 has ring gear teeth corresponding to the driving gear head, or a friction surface to mate to the friction capstan drive. In some embodiments, the top and bottom halves of the rotating base further comprise a plurality of support bearing surfaces 687. Power is supplied via the electrical contacts 650 and 652, as described above.

Nonvolatile Memory

In some embodiments, an intelligent game piece object comprises a nonvolatile memory 615. The nonvolatile memory 615 stores persistent object information such as a unique identifier, a name, special powers, score count, injury statistics, light and/or audio processing algorithms and other object information. FIGS. 7A through 7E illustrate partial memory maps of nonvolatile storage, assuming 128 registers of 16-bits each. The memory maps and values are merely illustrative. It will be recognized by one skilled in the art that a wide variety of memory maps are able to be used, so long as minimum functionality includes a unique identifier for the intelligent game piece object. Further, it will be recognized by one skilled in the art that the nonvolatile memory is able to be a subsystem of the processor or controller 610, or a subsystem of another integrating circuit, such as the audio processor 630 or transceiver 620.

Methods of Intelligent Game System Play

Figure 8A:
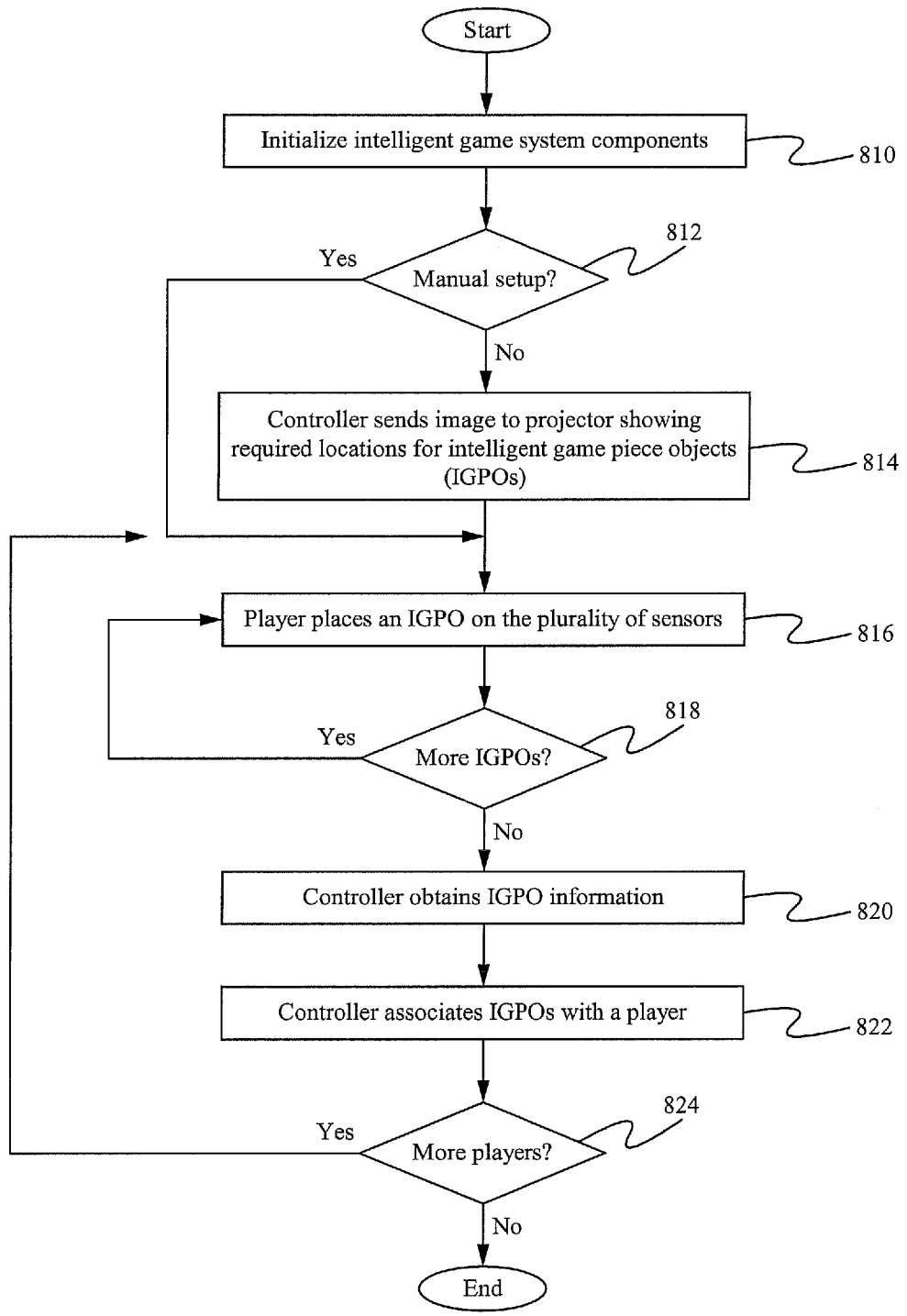
FIG. 8A illustrates a method of initializing an intelligent game system when starting a new game.

FIG. 8A illustrates a method of initializing game play for the start of a new game using an intelligent game system. At step 810, all intelligent game system components are initialized. At step 812, the user is presented with a decision whether they want to perform game piece setup manually, or automatically. If the user opts for automatic game piece setup, then at step 814 the controller sends an image to the projector to project onto the surface of the sensors, showing where the intelligent game piece objects are to be initially placed to begin game play. If the user opts for manual game piece setup, or following projection of the required game piece object locations for automatic game piece setup, then at step 816 the player(s) place intelligent game piece objects on individual sensor locations within the sensors. The placement of intelligent game piece objects onto the surface of the sensors continues until, at step 818, it is determined that no more game piece objects need to be placed. At step 820, the controller obtains intelligent game piece information from the intelligent game piece objects. At step 822, the intelligent game piece objects are associated with a player. At step 824, if another player's objects have not yet been placed, the process resumes at step 816, otherwise the process terminates.

Figure 8B:
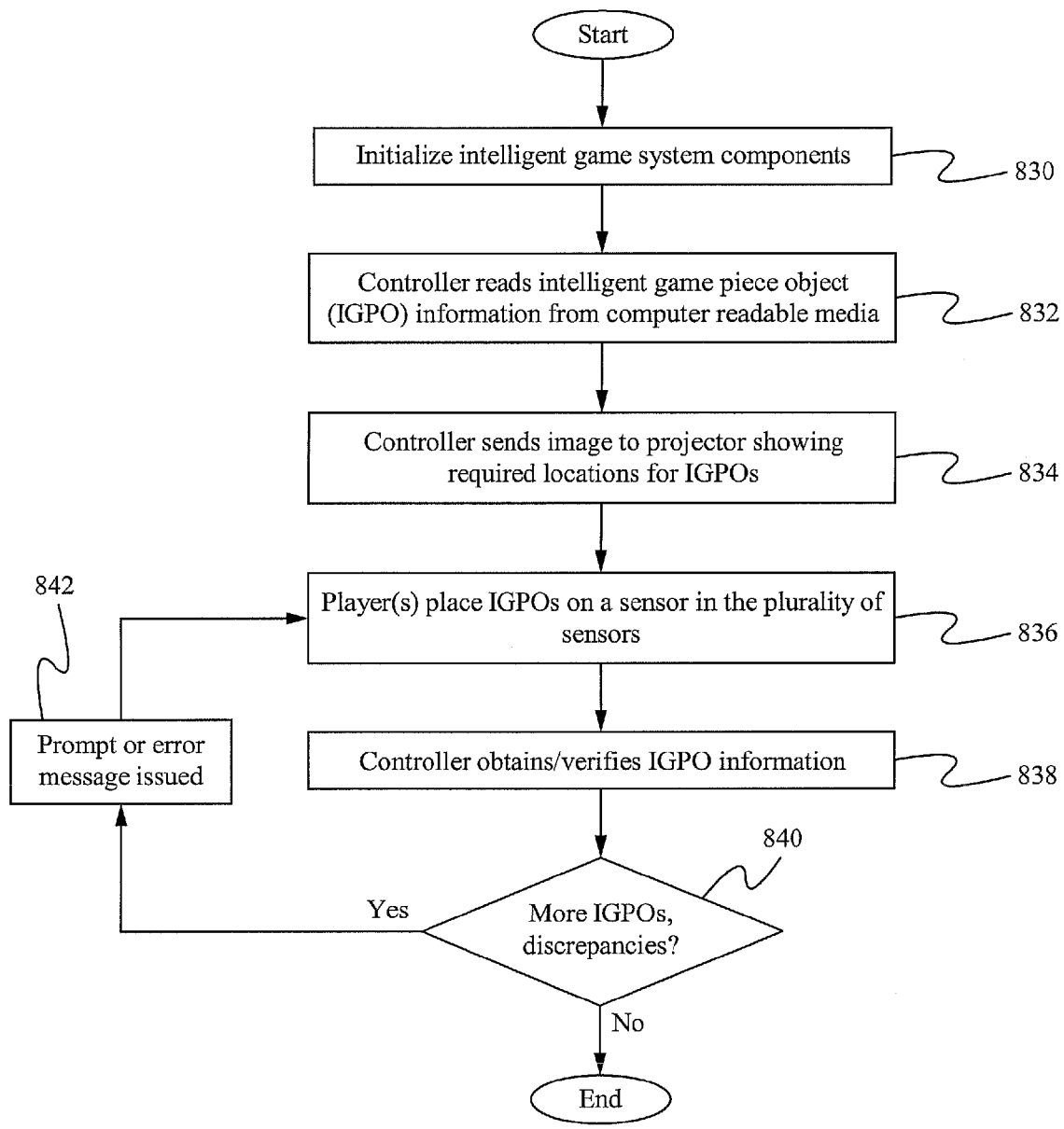
FIG. 8B illustrates a method of initializing an intelligent game system when resuming a game in progress using a computer readable media.

FIG. 8B illustrates a method of initializing game play for the resumption of a game in progress using an intelligent game system. At step 830, all intelligent game system components are initialized. At step 832, the controller reads intelligent game piece object information from a computer readable media. At step 834, the controller sends an image to the projector showing required locations for intelligent game piece objects to resume a previous game in progress. At step 836, a player places intelligent game piece objects on the sensors in the locations specified by the projected image. At step 838, the controller verifies the placement of intelligent game piece object(s). If it is determined at step 840 that there are more intelligent game piece objects to place, or that one or more intelligent game piece objects are placed on incorrect sensor(s), then a prompt or error message is issued and the process continues at step 836. One skilled in the art would recognize that the prompt or error message is able to be visual, displayed on the controller on via the projector, or audio, such as a spoken message, or any other relevant signal generated with the intelligent game system or the intelligent game piece objects. For example, an intelligent game piece object comprising a sound feature is able to direct the player to correct the intelligent game piece placement by a specific sound. An intelligent game piece object comprising a light feature is able to direct the player to correct the intelligent game piece placement by a specific sequence or pattern of illumination.

Figure 8C:
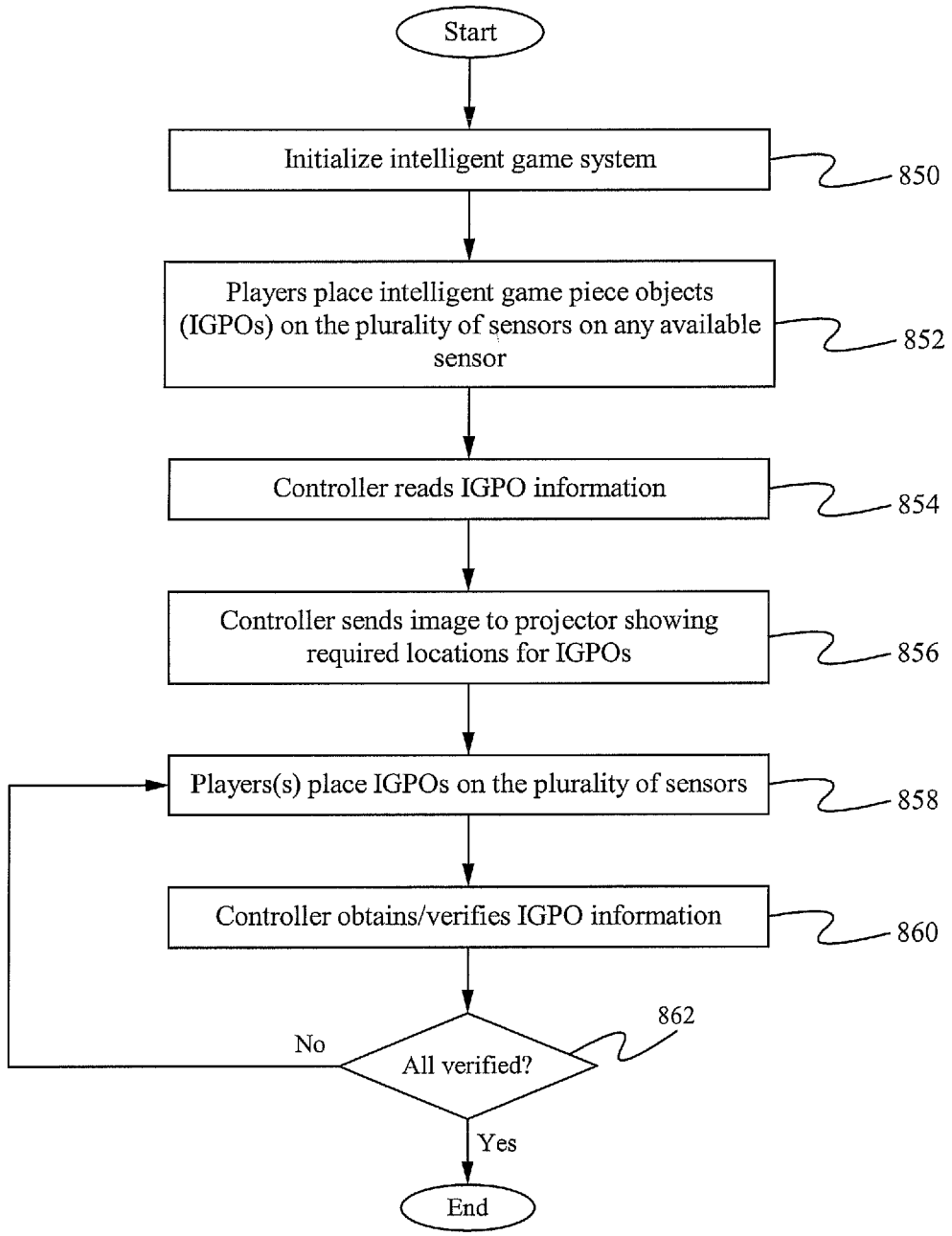
FIG. 8C illustrates a method of initializing an intelligent game system utilizing intelligent game piece object information stored within the intelligent game piece objects.

FIG. 8C illustrates a method of initializing game play for resumption of a game in progress using an intelligent game system according to some embodiments. At step 850, the intelligent game system hardware is initialized. Player(s) place intelligent game piece objects on the sensors at step 852, on any available sensor. Players are able to choose to place the intelligent game piece objects at, or near, where they remember them to be from the prior session of the game in progress. But, any available sensor will do. When the placement of intelligent game piece objects is completed, at step 854 the intelligent game system reads intelligent game piece object information from the intelligent game piece objects where the information comprises the unique identifier and sensor identifier stored in the intelligent game piece object during the prior session of the game in progress. At step 856, the controller sends an image to the projector showing required locations for the intelligent game piece objects. At step 858, player(s) then relocate intelligent game piece objects to the locations shown by the projected image. The controller obtains and verifies the placement of intelligent game piece objects at step 860. When the placement of all intelligent game piece objects has been verified, the process terminates at step 862.

Figure 8D:
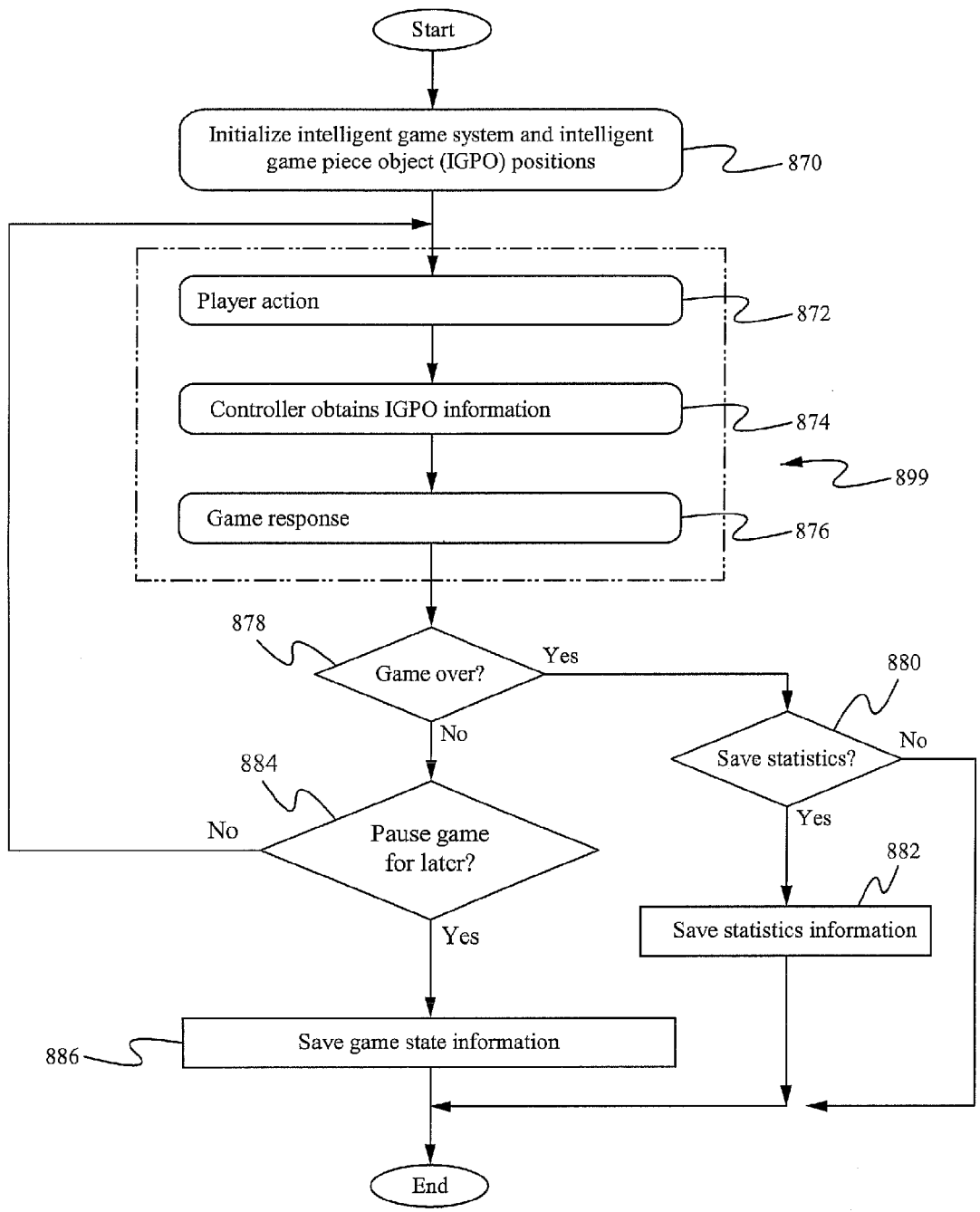
FIG. 8D illustrates an overview method of gameplay of a generic game according to some embodiments.

FIG. 8D illustrates an overview of game play of a generic game. The specific game logic, scoring, movement of players and other game specific-features is a function of the game application software, utilizing the intelligent game system and intelligent game piece object functionality. Step 899, shows the basic game engine, comprising player action, obtaining object information from intelligent game piece objects, and a game response. Starting the game at step 870, the game is initialized. Initialization of game play in an intelligent game system is able to be in accordance with FIGS. 8A through 8C, above. FIGS. 8A through 8C are illustrative of a process of game play initialization in an intelligent game system. At step 872, a player takes a player action. A player action is able to comprise the physical movement of an intelligent game piece object to another sensor in the sensors, or a player action is able to be an invocation of a game function or intelligent game piece object feature through any available input device in the intelligent game system. At step 874, the controller obtains intelligent game piece object information. At step 876, the game application software produces a response to the player action. Such a response is able to include sound and/or graphics.

At step 878, if the game is over, then the method branches to step 880, where the user is prompted whether the intelligent game system is to save game statistical information. At step 882, statistical information is saved. Such statistical information comprises information such as scoring information, location of intelligent game piece objects, and current dynamic information for intelligent game piece objects. In some embodiments, intelligent game piece object dynamic information comprises such items as weapon count, current stamina, injury statistics, accessory count and other game piece specific information. In an intelligent game piece object comprising nonvolatile memory, intelligent game piece-specific information is able to be stored within the intelligent game piece object. In some embodiments, all game play and intelligent game piece information is stored on a computer readable media. The computer readable media is able to be located within the controller, external to the controller, or is able to be a removable computer readable media. The statistical information is also able to be transmitted via network, or by email, to a remote destination for later use. If the game is not over, then a player is able to opt to pause the game in progress for later play at step 884. If the player opts to pause the game, then game state information is saved at step 886, otherwise play continues at 872. Game state information comprises any, or all, of the information described above in step 882 where statistical information is saved. In addition, if relevant, intelligent game piece object information indicating the identifier of the sensor at which each intelligent game piece object is presently positioned is stored. As with statistic information, the location of intelligent game piece objects is able to be stored in computer readable media in the controller, or a removable computer readable media, within nonvolatile storage within the intelligent game piece objects, or transferred by network to a remote server or by email.

Figure 9A:
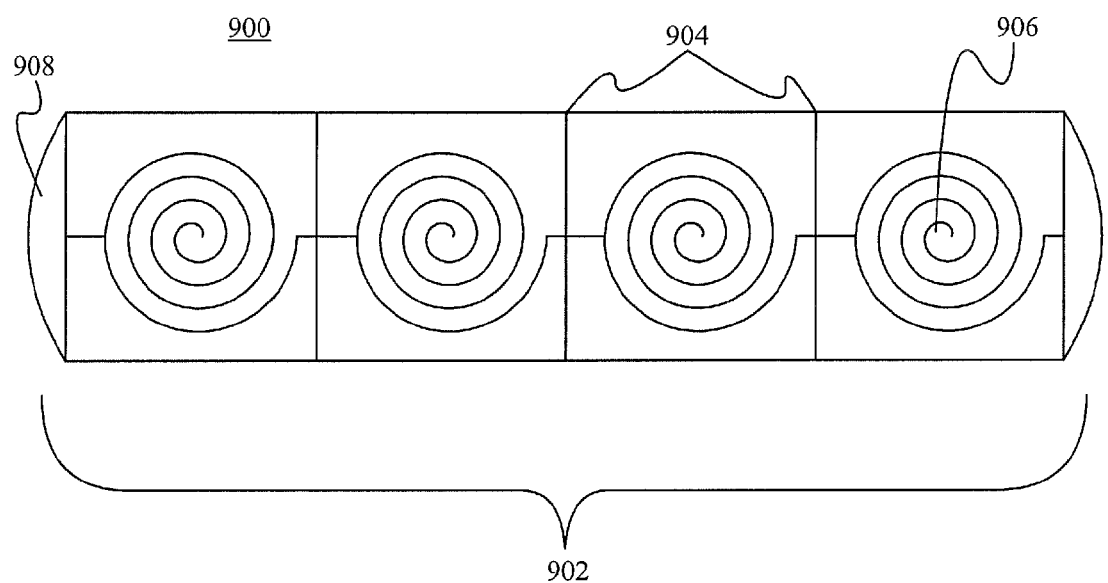
FIG. 9A illustrates a top view of a foldable three-dimensional terrain piece in accordance with some embodiments.
Figure 9B:
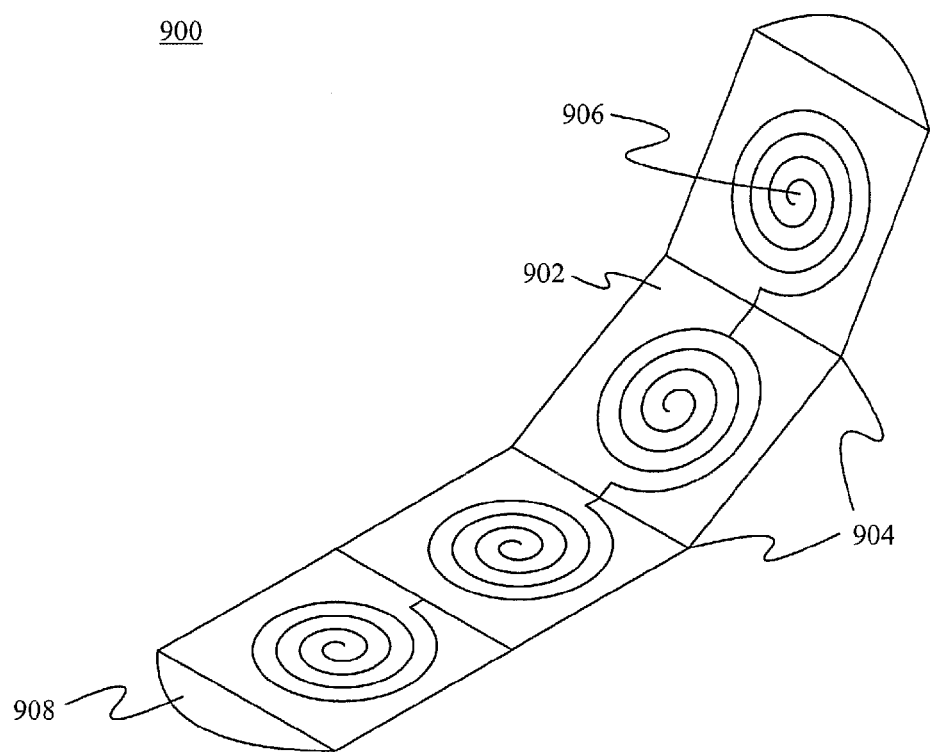
FIG. 9B illustrates a perspective view of a partially folded foldable three-dimensional terrain piece in accordance with some embodiments.
Figure 9C:
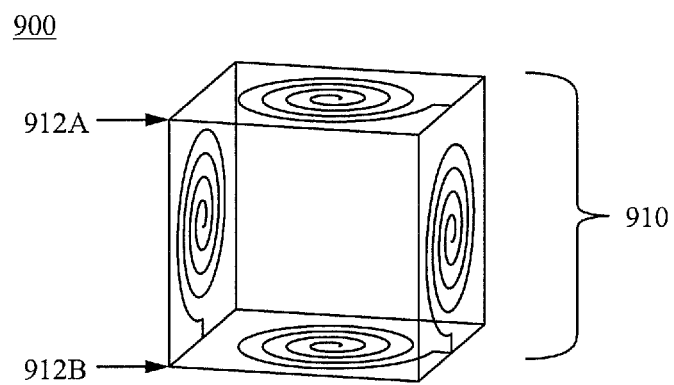
FIG. 9C illustrates a perspective view of a fully folded foldable three-dimensional terrain piece in accordance with some embodiments.
Figure 9D:
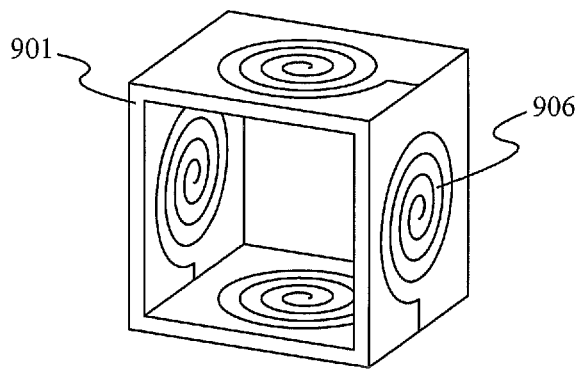
FIG. 9D illustrates a perspective view of a pre-formed three-dimensional terrain piece in accordance with some embodiments.

FIGS. 9A-9C illustrate foldable three-dimensional terrain 900 in accordance with some embodiments. The terrain 900, as shown in FIG. 9A, comprises a substantially flat substrate 902, one or more folding lines 904 and one or more sensors 906. Alternatively, the substrate 902 is not substantially flat. In some embodiments, as shown in FIGS. 9A-9C, the substrate 902 is configured in a rectangular shape. Alternatively, the substrate 902 is able to be a different shape. In some embodiments, the substrate 902 comprises plastic or paper. Alternatively, the substrate 902 comprises a combination of plastic, paper, wood or other material capable of forming the structure of a stable three-dimensional shape. In some embodiments, the foldable terrain 900 further comprises one or more fastening elements 908 for releasably fastening disconnected edges of the substrate 902 to each other. Alternatively, the fasteners 908 are configured to permanently fasten the terrain 900 together. In some embodiments, the fasteners 908 comprise extending tabs that are able to interlock or couple to each other or the substrate 902. Alternatively, the fasteners 908 are able to comprise other fastening methods such as glue or tape as are well known in the art. In some embodiments, as shown in FIG. 9D, the terrain 900''' is able to be a rigid mold 901 comprising one or more sensors 906. The pre-formed terrain 900''' being previously molded into the desired three-dimensional shape. The pre-formed terrain 900''' is able to comprise and combination of plastic, metal, wood, or other rigid material capable of being pre-formed. It should be noted that one skilled in the art would understand that because the terrain 900''' is molded or pre-formed, the terrain 900''' does not require folding lines 904 or fastening elements 908. Alternatively, the terrain 900''' comprises at least one folding line and/or fastening elements (not shown) allowing the terrain 900''' to open using the folding line as a hinge and fasten closed into the three-dimensional shape using the fasteners.

The folding lines 904 are positioned on the substrate such that the substrate 902 is able to bend along the folding lines 904. In some embodiments, the position and dimension of the folding lines 904 is predetermined based on the desired three-dimensional shape 910 of the three-dimensional terrain 900. Alternatively, the folding lines 904 are positioned and dimensioned such that the substrate 902 is able to bend into a multitude of three-dimensional shapes. In some embodiments, the folding lines 904 comprise a thinner or weakened portion of the substrate 902 that permits the substrate to more easily bend along the folding lines 904 as shown in FIG. 9B. Alternatively, the folding lines 904 comprise a flexible area of the substrate 902 that allows the substrate 902 to bend along the folding lines 904. Alternatively, in some embodiments, the folding lines 904 represent edges of a plurality of discrete terrain pieces, which are able to be coupled together to form a desired three-dimensional shape. In such embodiments, the discrete terrain pieces 900 are able to be coupled together by one or more fasteners 908.

Figure 11:
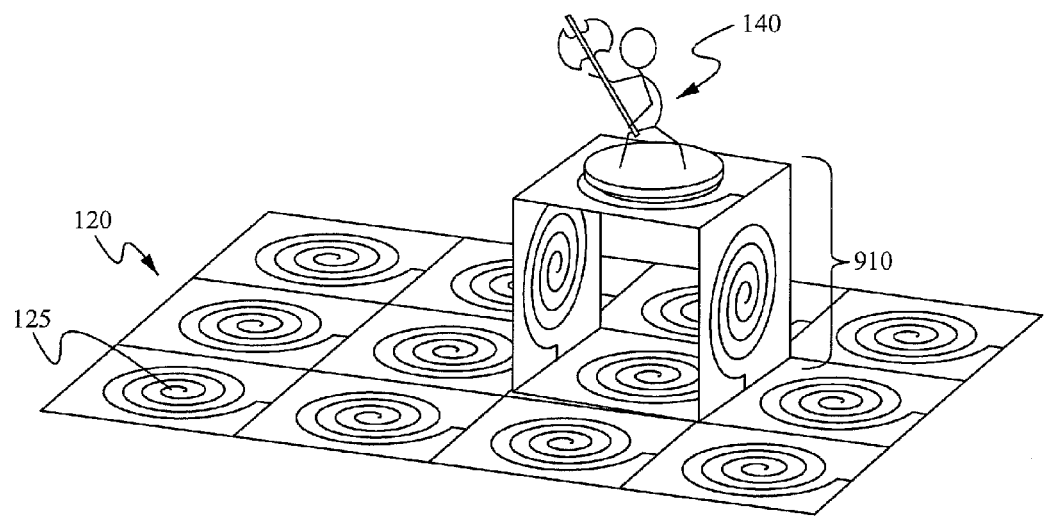
FIG. 11 illustrates a perspective view of a foldable three-dimensional terrain piece in use with a game board and a game piece in accordance with some embodiments.
Figure 12:
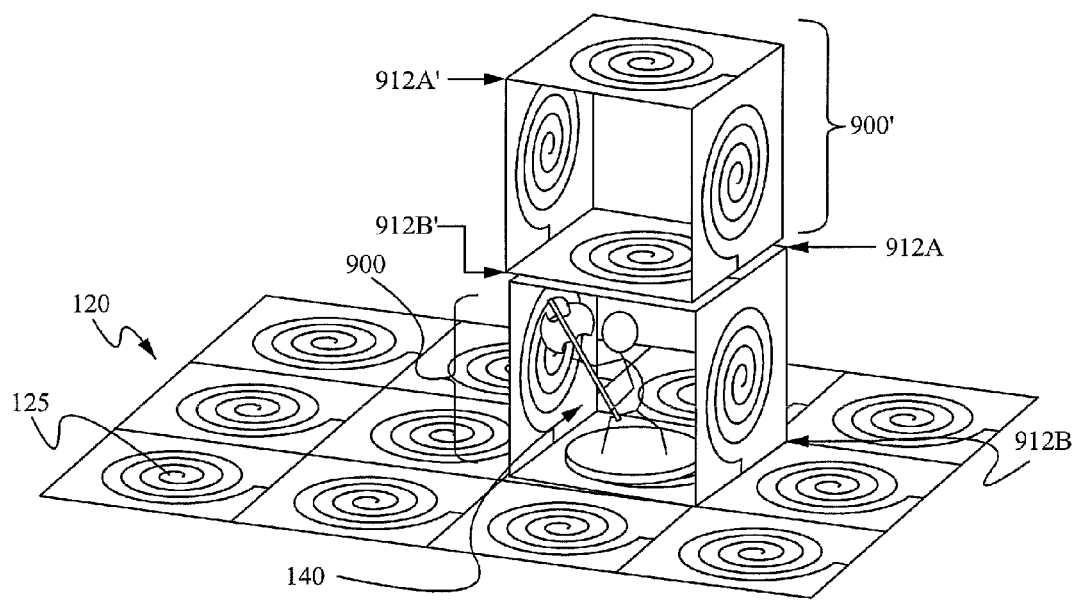
FIG. 12 illustrates a perspective view of two foldable three-dimensional terrain pieces in use with a game board and a game piece in accordance with some embodiments.

The sensors 906 are able to be substantially similar to the sensors 125, 265, 280, 285 described above in relation to FIGS. 2A, 2D, 2G and 2H. In particular, the sensors 906 are configured to sense one or more game pieces 140 when the game pieces 140 are positioned on top of one or more of the sensors 906. Accordingly, the sensors 906 are able to detect when a game piece 140 is on top of the terrain 900 as shown in FIG. 11, or within the terrain 900 as shown in FIG. 12. Further, in some embodiments, the sensors 906 are able to detect when another foldable three-dimensional terrain 900' is positioned on top of one or more of the sensors 906 as shown in FIG. 12. Although FIG. 12 only illustrates a single game piece 140 and single terrain 900' stacked on top of another terrain 900, it is understood that a number of terrains are able to be stacked along with a plurality of game pieces 140 on the various levels 912A, 912B, 912A', 912B'. As a result, the terrain 900 provides the advantage of being able to determine the position of game pieces 140 and/or other terrain 900 even if the game pieces 140 are located within the terrain 900 and therefore occluded or blocked from the view of an overhead camera. In some embodiments, the sensors 906 are positioned on the substrate 902 such that at least one sensor is located at each area on the terrain 900 where a game piece 140 could be placed during gameplay. Alternatively, the sensors 906 are able to be positioned anywhere on the substrate 902. In some embodiments, the sensors 906 are coupled together such that the sensors 906 are able to communicate with each other and/or a game board 120 sensor 125. Alternatively, one or more of the sensors 906 are isolated from the other sensors 906.

The three-dimensional shape 910 of the terrain 900 comprises one or more levels. Specifically, as shown in FIG. 9C, the three-dimensional shape 910 comprises two levels: a lower level 912B and an upper level 912A. Alternatively, the three-dimensional shape 910 is able to comprise a number of levels. In some embodiments, each level is positioned at a different elevation above the game board 120. Alternatively, one or more of the levels are positioned at the same elevation above the game board 120. In FIG. 9C, the lower level 912B is also an inner level as game pieces 140 positioned on lower level 912B would be positioned within the three-dimensional shape 910 and thus occluded from an overhead view of the game board 120. As described above, the sensors 906 are able to sense a game piece 140 positioned on the lower level 912B even though the game piece 140 is inside the terrain 900. It is understood that the three-dimensional shape 910 of the terrain 900 is able to have a number of levels, shapes and sizes in order to achieve the appearance and feel of the terrain needed for the game.

Figure 10:
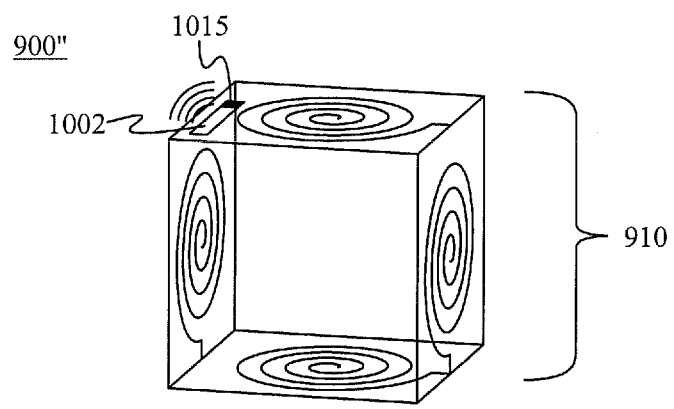
FIG. 10 illustrates a perspective view of an intelligent foldable three-dimensional terrain piece in accordance with some embodiments.

In some embodiments, as shown in FIG. 10, the terrain 900" comprises one or more RFID tags 1002 and terrain object information including a terrain identifier such that the terrain 900" is intelligent terrain similar to the intelligent game piece objects 600 described above. As a result, the intelligent terrain 900" is able to have properties and be uniquely identified by the controller 115 wherein gameplay is able to be adjusted based on the properties. For example, upon identifying the terrain 900" using the terrain object information, the controller 115 is able to adjust the gameplay according to the dimensions of the terrain 900". Thus, a warrior game piece 140 positioned within or on an intelligent terrain piece 900" could be registered as unseen by nearby pieces or be given a tactical bonus when fighting with other pieces based on the position within or on the terrain 900". In some embodiments, the terrain identifier is a unique identifier. In some embodiments, the intelligent terrain comprises an RFID tag for each of the sensors 906 on the terrain 900. The terrain object information is stored in a nonvolatile memory 1015 that is substantially similar to the nonvolatile memory 615 described above. The nonvolatile memory 1015 stores persistent terrain object information, similar to the object information illustrated in FIGS. 7A-7E, such as a unique identifier, a name, special powers, light and/or audio processing algorithms and other object information. Again, it will be recognized by one skilled in the art that a wide variety of memory maps are able to be used, so long as minimum functionality includes a unique identifier for the intelligent terrain 900". In some embodiments, the intelligent terrain 900" comprises one or more of a processor/controller, a transceiver, an audio processor, audio distribution equipment, a light emitting source, one or more light transmitters, light diffusers, an opto-detector, batteries and power source contacts. It is noted that the connections and operation of these one or more elements of the intelligent terrain 900" is substantially similar to the description corresponding to the same elements within the intelligent game piece object 600 described above with reference to FIGS. 6A-6C and therefore is not repeated here for the sake of brevity.

Figure 13:
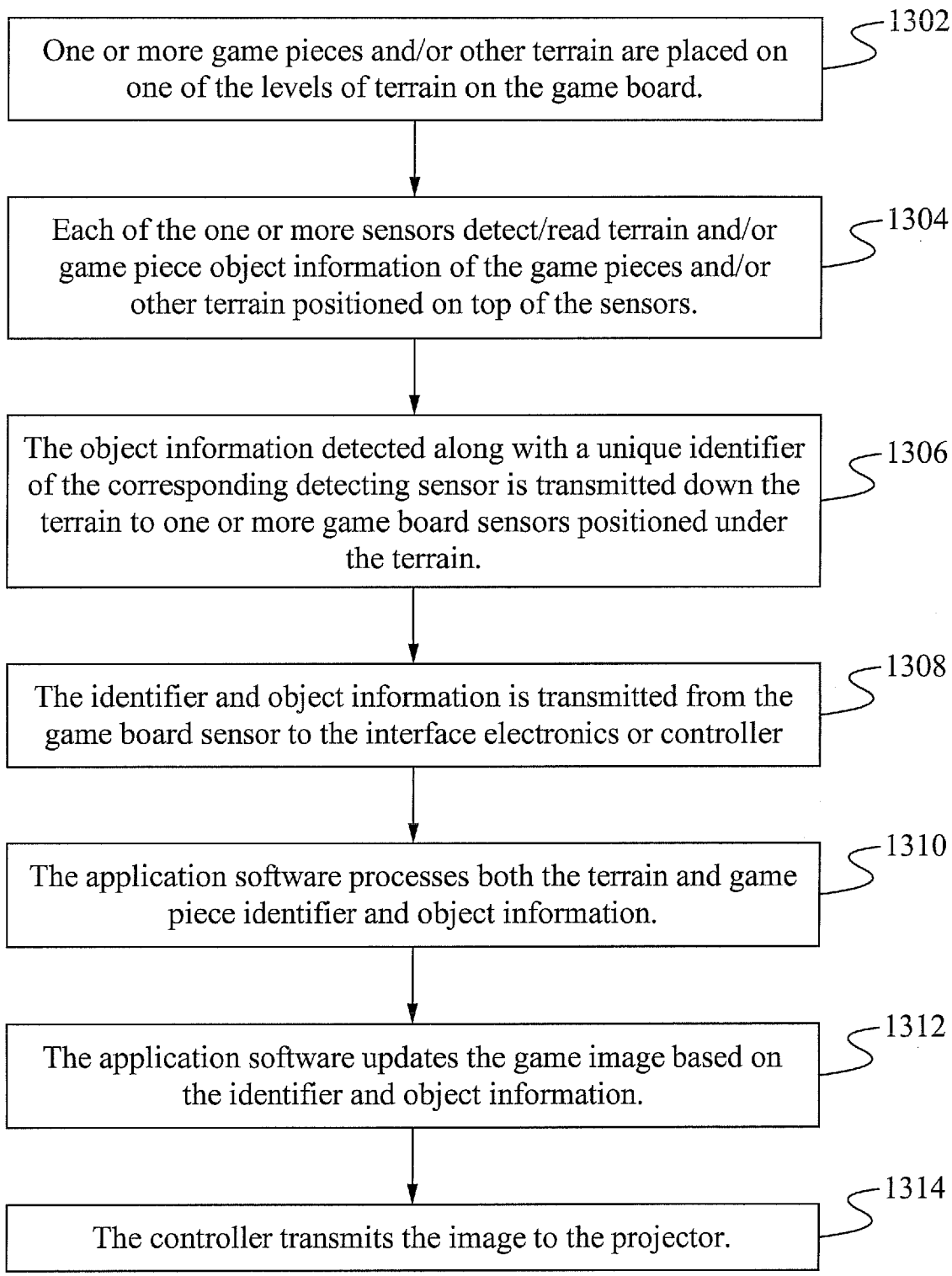
FIG. 13 illustrates a flow chart of detecting a game piece on a foldable three-dimensional terrain piece in accordance with some embodiments.

The operation of a foldable three-dimensional terrain 900 will now be discussed in reference to the flow chart illustrated in FIG. 13. In operation, one or more game pieces 140 and/or other terrain 900' are placed on one of the levels 912A, 912B of terrain 900 on the game board 120 at the step 1302. Each of the one or more sensors 906 detect/read terrain and/or game piece object information of the game pieces 140 and/or other terrain 900' positioned on top of the sensors 906 at the step 1304. The object information detected along with a unique identifier of the corresponding detecting sensor is transmitted down the terrain 900 to one or more game board sensors 125 positioned under the terrain 900 at the step 1306. In some embodiments, if one or more of the terrain is intelligent terrain 900", the terrain object information is also transmitted to the corresponding game board sensor 125. Alternatively, the terrain object information is transmitted directly to the controller with a transceiver or other transmitting device. In some embodiments, if one or more of the terrains 900, 900', 900" are stacked, the upper terrain 900' transmits the identifier and object information to the immediately lower terrain 900' until a bottom terrain 900 is reached that is able to transmit the identifier and object information to the corresponding game board sensor 125. In this manner, regardless of the height of the stack of terrain 900, 900', the identifiers and object information is able to be transmitted to the game board sensors 125 below. The identifier and object information is transmitted from the game board sensor 125 to the interface electronics or controller at step 1308. The application software processes the terrain and game piece identifier and object information at the step 1310. The application software updates the game image based on the terrain and game piece identifier and object information at the step 1312. The controller transmits the image to the projector at the step 1314. As a result, the gameplay and image are able to be adjusted based on the object information received by the terrain 900, 900'. The core game features of an intelligent game system are performed in the application software. Such features include producing graphics and sound, scoring points for game play, and executing the game in accordance with the game rules.

The intelligent gaming system described herein has numerous advantages. Specifically, the three-dimensional terrain pieces have the advantage of allowing gameplay to take place on multiple levels while game pieces are still automatically tracked by a controller. Indeed, the terrain pieces are able to sense when other game or terrain pieces are positioned on or within the terrain pieces sometimes including multiple levels some of which are occluded from an overhead camera. Another advantage is that the terrain pieces are able to be configured into a flat position for storage and transport, and include one or more fold lines such that the flat terrain can be folded into three-dimensional shapes. Yet another advantage is that the terrain is able to be intelligent terrain that has a unique identifier and other properties that can be tracked by the game controller. As a result, the gameplay is able to be adjusted based on the position of the terrain pieces including terrain pieces stacked upon one another and including game pieces on and/or within multiple levels of the terrain pieces. Indeed, these advantages even allow for the use of flying pieces that take advantage of the tracking and three dimensional terrain as a manner of "flying". Accordingly, the intelligent gaming system has numerous advantages over the prior art.

It will be understood by those skilled in the art that the players are able to use intelligent game piece objects, or virtual game piece objects. Virtual game piece objects are projected onto the surface of the sensors. Thus, a virtual player is able to be, for example, the controller or a live game player accessing the intelligent game system via a network. Further, all players are able to be virtual players, such as for demonstrating a training mode or arcade mode where the game plays against itself, using virtual game piece objects to demonstrate game play or to attract players to the game by demonstrating its features and game play. Since the virtual players are mere images whose location is determined by the controller, intelligent game piece objects and virtual game piece objects are able to occupy the same sensor location.

In operation, a system for putting intelligence into board and tabletop games including miniatures comprises a game play surface including sensors capable of identifying the location and unique identity of game pieces and terrain pieces on the game play surface. Additionally, the terrain pieces include sensors that are also capable of identifying the location and unique identity of game pieces and/or other terrain pieces on and/or within the surface of the terrain pieces. The terrain pieces are able to transfer this location and unique identity to a sensor positioned beneath them whether that sensor is a part of another terrain piece or the game board. Each sensor in the game play surface corresponds to a portion of an image to be displayed by an overhead projector onto the game play surface. The image to be displayed is adjusted based on the sensed position of the game and/or terrain pieces. Interface electronics coupled to the game play surface read the sensors comprising the game play surface including information transferred to the game play surface by the terrain pieces. Each sensor reading comprises an identifier of the sensor and at least an identifier of a game piece and/or terrain piece on the sensor, if a piece is present on the sensor. For each sensor in the game play surface, the interface electronics pass the sensor identifier and the identifier of any game and/or terrain piece on the sensor, to the controller. The controller comprises a computer readable media programmed with a game application software. The game application software receives the sensor identifier, game piece identifier and/or terrain piece identifier for each sensor and utilizes the information to maintain scoring of the game and provide enhanced game play features.

The controller further comprises an interface for transmitting the game play image to an overhead projector such as a DLP® or LCD projector. The controller further comprises an interface for transmitting sound to a sound system or speakers connected to the controller. Enhanced game play features include graphics projected onto the game play surface and sounds transmitted to the sound system or speakers to enhance the game playing experience. Game logic includes scoring, enabled by the controller's awareness of the location and identification of game pieces on the game play surface. Information gathered from the sensors comprising game state information, game play statistics, and game piece information are able to be stored to a computer readable media within the controller, or a removable computer readable media, to enable users to resume a game in progress at a later time or on a different system and to maintain statistics of game play and statistics for individual game pieces.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications are able to be made in the embodiment chosen for illustration without departing from the spirit and scope of the invention as defined by the claims.

What is claimed is:

1. An intelligent game system comprising:
   a. a game board comprising one or more game board sensors;
   b. one or more game pieces each comprising game piece object information capable of being read by the game board sensors;
   c. one or more three-dimensional objects each having a hollow body including a plurality of levels and one or more object sensors, wherein the plurality of levels are positioned on the hollow body, wherein an inner level of the levels is positioned within a hollow portion of the hollow body and an elevated level of the levels is positioned such that when one of the three-dimensional objects is on top of the game board the elevated level is substantially elevated above the game board;
   d. interface electronics coupled to receive the game piece object information from each game board sensor;
   e. a controller coupled to receive the game piece object information of each game board sensor from the interface electronics, and to associate the game piece object information with a portion of an image;
   f. a non-transitory storage media, programmed with instructions for implementing a game, and configured to be read by the controller; and
   g. a projector, coupled to receive image information from the controller, wherein the projector receives image information from the controller and projects the image onto the surface of the game board sensors based on the image information received from the controller;
      wherein the one or more object sensors are configured to sense the one or more game pieces when the one or more game pieces are positioned on the plurality of levels of the three-dimensional object; and
      wherein the one or more object sensors are configured to sense the one or more game pieces when one or more game pieces are positioned within the inner level within the hollow portion of the hollow body of the three-dimensional object.

2. The intelligent game system of claim 1 wherein each level corresponds to a different elevation above the game board.

3. The intelligent game system of claim 2 wherein the one or more object sensors are configured to sense when one or more additional three-dimensional objects are positioned on top of the plurality of levels.

4. The intelligent game system of claim 3 wherein when the one or more three-dimensional objects sense the one or more game pieces or the one or more additional three-dimensional objects, the three-dimensional object communicates presence of the one or more game pieces or the one or more additional three-dimensional objects to at least one of the one or more game board sensors located underneath the three-dimensional object.

5. The intelligent game system of claim 4 wherein at least one of the one or more three-dimensional objects and or the one or more additional three-dimensional objects comprise object information that uniquely identifies the corresponding three-dimensional object and or additional three-dimensional object.

6. The intelligent game system of claim 5 wherein the object information comprises an object identifier that is an RFID tag or a bar code.

7. The intelligent game system of claim 6 wherein the one or more game board sensors that can read the object information when the one or more three-dimensional objects are located on top of one or more of the one or more game board sensors.

8. The intelligent game system of claim 1 wherein the one or more three-dimensional objects further comprise one or more folding lines configured to bend such that the one or more three-dimensional objects can be arranged into three-dimensional shapes.

9. The intelligent game system of claim 8 wherein at least one of the one or more three-dimensional objects further comprise object information capable of being read by the one or more game board sensors.

10. The intelligent game system of claim 9 wherein the object information and game piece object information comprise identifiers.

11. The intelligent game system of claim 1 wherein the projector adjusts the image based on the position of the one or more three-dimensional objects.

12. The intelligent game system of claim 1 wherein each of the one or more game board sensors correspond to a portion of the image.

13. A three-dimensional object for use with a game board having one or more game board sensors, the three-dimensional object comprising:
   a. a planar body having one or more fasteners;
   b. one or more object sensors within the body;
   c. object information capable of being read by the one or more game board sensors, wherein the object information comprises an object identifier that uniquely identifies the three-dimensional object such that three dimensional object is able to be distinguished from other three-dimensional object of the same type; and
   d. one or more folding lines formed by a flexible portion of the body;
   wherein the fasteners and the folding lines are positioned along the body such that when folded along the folding lines and held together by the fasteners, the three-dimensional object forms a predetermined non-flat shape having a hollow body, and further wherein the non-flat shape comprises a plurality of levels positioned on the hollow body, wherein an inner level of the levels is positioned within a hollow portion of the hollow body and an elevated level of the levels is positioned such that when the three-dimensional object is on top of the game board in the non-flat shape, the elevated level is substantially elevated above the game board;
   wherein the one or more object sensors are configured to sense the one or more game pieces when the one or more game pieces are positioned on the plurality of levels of the three-dimensional object; and
   wherein the one or more object sensors are configured to sense the one or more game pieces when one or more game pieces are positioned within the inner level within the hollow portion of the hollow body of the three-dimensional object.

14. The three-dimensional object of claim 13 wherein each level corresponds to a different elevation above the game board.

* * * * *